United States Patent
Saito

(10) Patent No.: US 7,724,206 B2
(45) Date of Patent: May 25, 2010

(54) POSITION ADJUSTMENT METHOD FOR PROJECTION IMAGES

(75) Inventor: Toshiki Saito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 980 days.

(21) Appl. No.: 11/458,264

(22) Filed: Jul. 18, 2006

(65) Prior Publication Data

US 2009/0066723 A1 Mar. 12, 2009

(30) Foreign Application Priority Data

Aug. 1, 2005 (JP) .............................. 2005-222525

(51) Int. Cl.
*G09G 5/00* (2006.01)
(52) U.S. Cl. ........................ 345/1.3; 345/629; 345/589; 345/631; 348/744; 348/745
(58) Field of Classification Search ................ 345/629, 345/1.3, 631, 589; 348/744, 745
See application file for complete search history.

(56) References Cited

U.S. PATENT DOCUMENTS 6,480,175 B1 * 11/2002 Schneider .................... 345/32
6,727,864 B1 * 4/2004 Johnson et al. .............. 345/1.3
6,760,075 B2 * 7/2004 Mayer et al. ................. 348/383

FOREIGN PATENT DOCUMENTS

| JP | A-2001-356005 | 12/2001 |
| JP | A-2002-365718 | 12/2002 |

* cited by examiner

*Primary Examiner*—Michelle K Lay
(74) *Attorney, Agent, or Firm*—Oliff & Berridge PLC

(57) ABSTRACT

A position adjustment method for adjusting positions of two projection images projected from multiple projectors contained in a multi-projection display onto a projection surface such that the images overlap. A first step involves setting pixel values of colors such that a predetermined characteristic is exhibited in an overlapping area when the adjustment images are projected. A second step involves producing adjustment image data corresponding to the adjustment images. Colors of the adjustment images are allocated to patterns such that the patterns overlap when the adjustment images are projected. A third step involves giving the adjustment image data to the multiple projectors and calculating evaluation values associated with the image data that is obtained by taking an image of the projection surface on which the adjustment images are projected from the multiple projectors. A forth step involves performing position adjustment for the projection images based on the evaluation values.

16 Claims, 16 Drawing Sheets

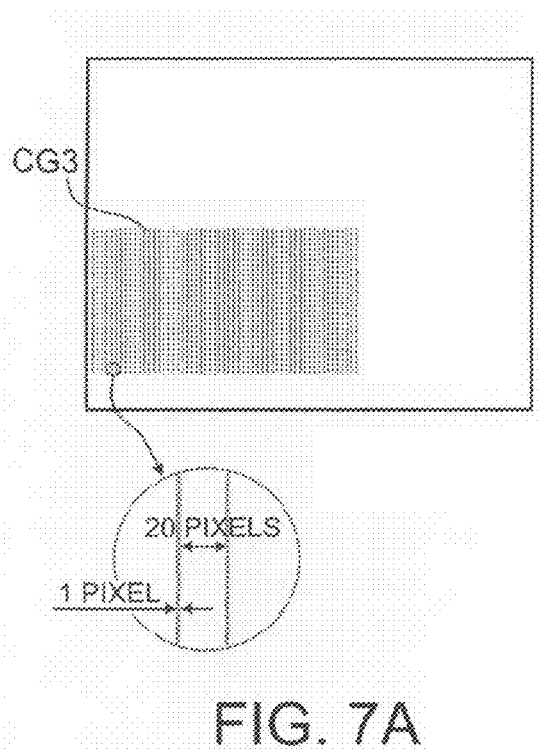 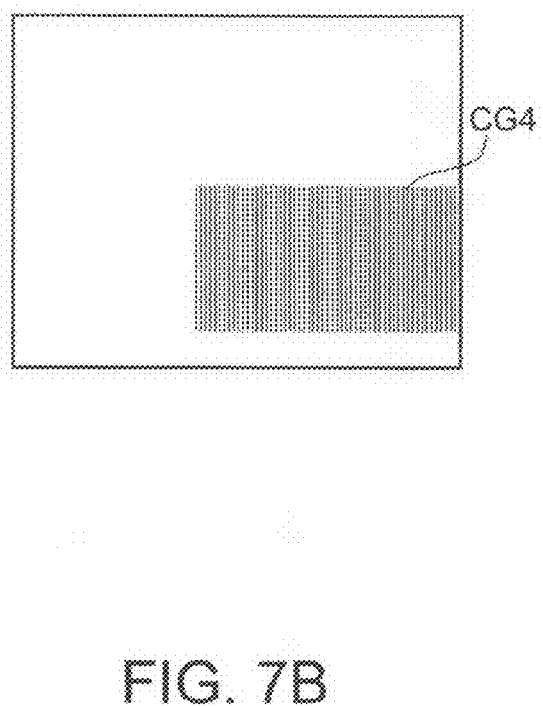
FIG. 7A   FIG. 7B
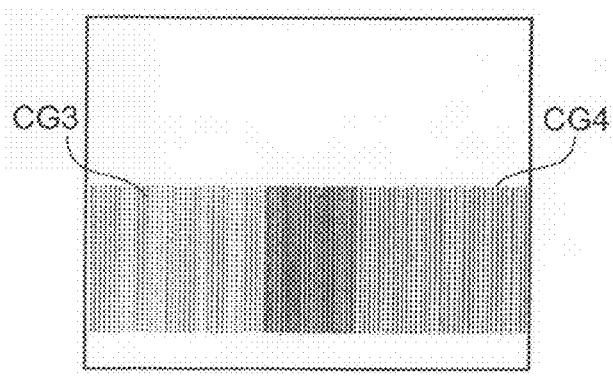
FIG. 8

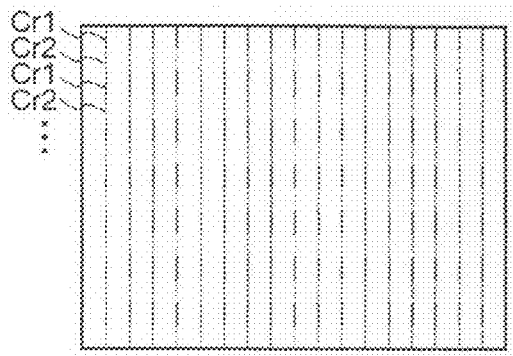 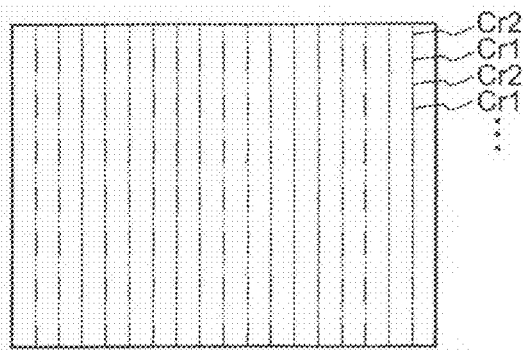
FIG.13A ADJUSTMENT IMAGE CG13      FIG.13B ADJUSTMENT IMAGE CG14
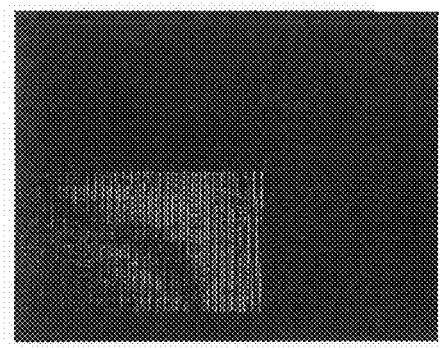 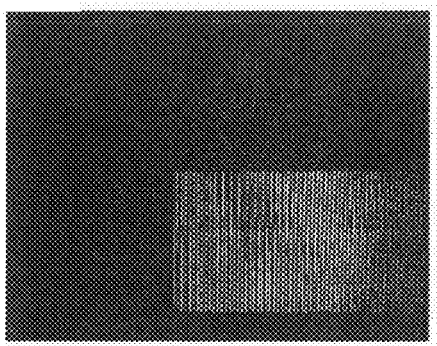
FIG.14A ADJUSTMENT IMAGE CG13      FIG.14B ADJUSTMENT IMAGE CG14
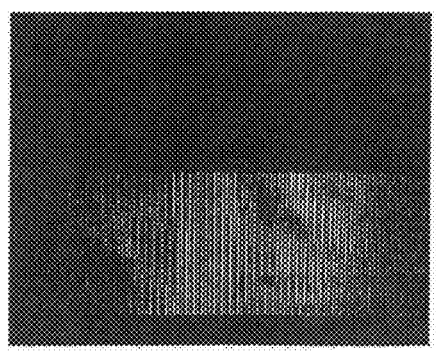
FIG.15

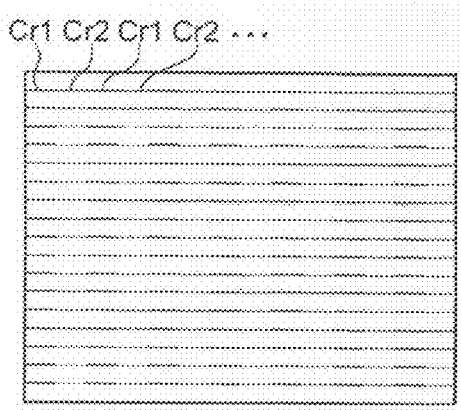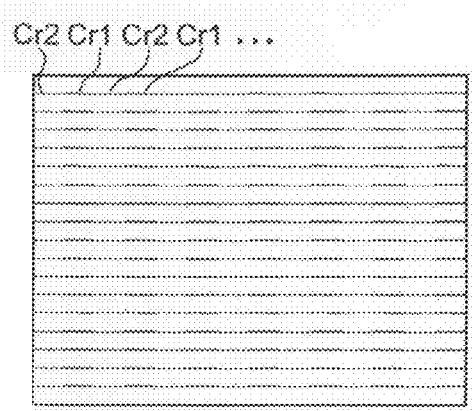
FIG.21A  FIG.21B
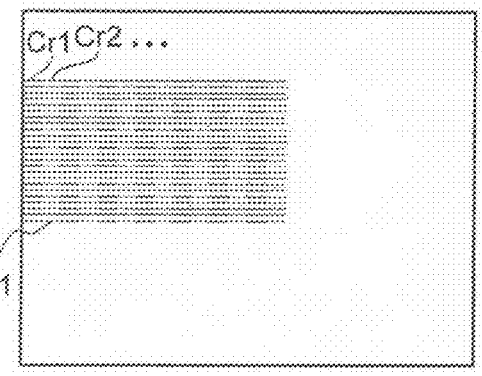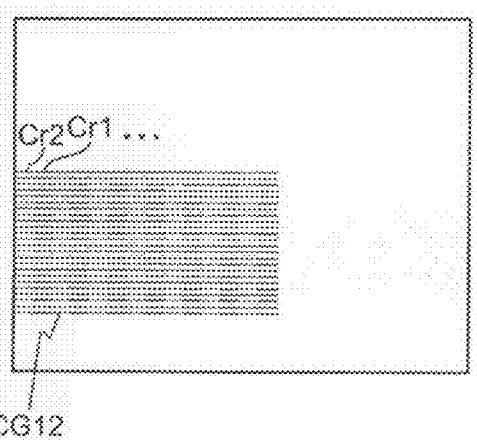
FIG.22A  FIG.22B
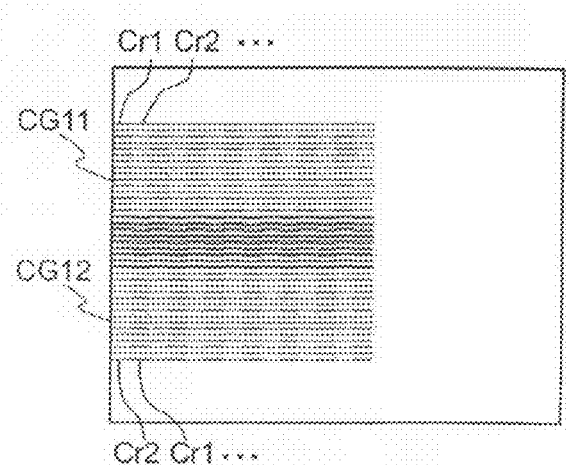
FIG.23

POSITION ADJUSTMENT METHOD FOR PROJECTION IMAGES

BACKGROUND

1. Technical Field

The present invention relates to a position adjustment method for projection images used in a multi-projection display which produces a picture by projecting images from a plurality of projectors onto a projection surface, a position adjustment apparatus for projection images, a position adjustment program for projection images, and a multi-projection display.

2. Related Art

Currently, a multi-projection display which projects images from a plurality of projectors onto a projection surface by tiling projection or stacking projection is known. According to the multi-projection display, the accuracy of position adjustment for the respective projection images on the projection surface has a great effect on the quality of the projection images.

In a case of the tiling projection, for example, low accuracy of position adjustment causes considerable deterioration of the projection image quality such as discontinuous joints between the respective projection images and blurs in the overlapping areas.

To overcome this drawback, position adjustment for the respective projection images is essential, but this requires great time and labor and also high-level position adjustment technique when the position adjustment is manually performed by a user.

Accordingly, various methods for automatically executing position adjustment have been proposed (for example, see JP-A-2001-356005 and JP-A-2002-365718).

According to the technique shown in JP-A-2001-356005, a plurality of test pattern images (which exhibit luminance distributions having mountain-shaped waveforms) projected on a projection surface are taken by a camera to obtain the respective typical positions (central positions of mountain-shaped waveforms) of the plural test patterns from the taken image data. Then, based on the respective typical positions thus obtained, the distances between the respective test pattern images and the distances between the cross points of the line segments connecting the test pattern images and the adjoining pictures in both or either of the horizontal direction and the vertical direction are obtained so as to determine positional displacement based on those distances.

According to the technique disclosed in JP-A-2002-365718, two adjustment patterns each having a black portion along the boundary between adjoining projection images and a white portion located inside the black portion are displayed by two projectors to show a dark line on the overlapping area. Then, the image of the black portion is taken by an image taking device while gradually decreasing the width of the black portion. Subsequently, the width changes of the dark line are observed based on the image data thus taken and the position at which the dark line disappears is stored as a boundary position. Thereafter, position adjustment is conducted such that the contours of the projection images coming from the respective projection devices coincide with the boundary position.

In both the techniques shown in JP-A-2001-356005 and JP-A-2002-365718, adjustment images are projected on the projection surface using two projectors and then are taken by the image taking device so as to perform position adjustment based on the image data thus taken.

According to the technique disclosed in JP-A-2001-356005, displacement can be detected using an image taking device having lower resolution than that of the projection images. However, since complicated image analysis processing is required for displacement detection, an image data processing device having sufficiently high processing performance is needed. Also, since the calculation volume is large, processes required for correcting displacement cannot be carried out at high speed.

According to the technique shown in JP-A-2002-365718, an image taking device having high resolution sufficient for resolving the projection images by pixel is required to obtain the boundary position with high accuracy.

Moreover, when position adjustment is performed using the methods disclosed in JP-A-2001-356005 and JP-A-2002-365718, it is necessary to consider the effect of the illumination condition inside a room where the position adjustment is conducted or in other environment given to the image taking device. This is because appropriate position adjustment cannot be achieved in many cases based on image data each obtained under the environment of different illumination conditions. In an extremely dark environment having no illumination such as a darkroom, for example, the effect of some inhibiting factors which are ignorable under the illumination condition of normal brightness increases and thus prevents achievement of appropriate position adjustment. Examples of the inhibiting factors include the color array structure of color filters used in a single-plate-type image taking device, for example, which will be described later.

Thus, in a case of position adjustment in the extremely dark environment such as a darkroom, consideration for the effect of the inhibiting factors is essential. However, no such consideration is especially discussed for the techniques of JP-A-2001-356005 and JP-A-2002-365718 .

SUMMARY

It is an advantage of some aspects of the invention to provide a position adjustment method for projection images, a position adjustment apparatus for projection images, a position adjustment program for projection images, and a multi-projection display, which are capable of adjusting positions of projection images projected from a plurality of projectors onto a projection surface with high accuracy in an extremely dark environment such as a darkroom.

A position adjustment method for projection images according to a first aspect of the invention adjusts positions of two projection images projected from two of plural projectors contained in a multi-projection display onto a projection surface such that the two projection images have an overlapping area by using two adjustment images one of which has a first pattern and the other of which has a second pattern. The position adjustment method for projection images includes: setting pixel values of a first color and pixel values of a second color such that a predetermined characteristic is exhibited in the overlapping area when the two adjustment images are projected at appropriately correlated positions, producing two adjustment image data, corresponding to the two adjustment images, in which the first color and the second color are allocated to the first pattern and the second pattern such that the first color of the first pattern overlaps with the second color of the second pattern and such that the second color of the first pattern overlaps with the first color of the second pattern when the two adjustment images are projected at appropriately correlated positions, and giving the adjustment image data to the two projectors; calculating evaluation values associated with the characteristic based on image data obtained by taking an image of the projection surface on which the two adjustment images corresponding to the two adjustment image data are projected from the two projectors; performing position adjustment for the two projection images based on the evaluation values.

According to the color array structure of this method, the first color and second color are allocated to the first pattern and second pattern such that the first color of the first pattern overlaps with the second color of the second pattern and such that the second color of the first pattern overlaps with the first color of the second pattern when the two adjustment images are projected at appropriately correlated positions. Since the effect of the inhibiting factors is considered, position adjustment with high accuracy can be achieved in an extremely dark environment such as a darkroom.

In the position adjustment method for projection images according to the first aspect of the invention, the image taking device is a single-plate-type image taking device which contains color filters having a color array structure of Bayer arrays.

The color filters used in the single-plate-type image taking device typically contains a color array structure having Bayer arrays. In the color array structure having Bayer arrays, green filters which transmit green form a checkered pattern in the respective rows and lines. However, the red filters and blue filters are alternately disposed in the directions of lines and rows, i.e., in every other line and row.

This color array structure of the color filters in the image taking device deteriorates repeatability of the red and blue components. When the position adjustment is performed based on the image data obtained in the extremely dark environment, the position shifted by a predetermined number of pixels from the original optimum projection position is determined as the optimum projection position. To overcome this drawback, the color arrangements for the first pattern and second pattern of the two adjustment images are established by the method according to the first aspect of the invention. This method solves the problem that the position shifted by a predetermined number of pixels from the original optimum projection position is determined as the optimum projection position.

In the position adjustment method for projection images according to the first aspect of the invention, it is preferable that the first color and the second color are alternately allocated to each of the first pattern and the second pattern in a predetermined cycle.

The advantages offered by the position adjustment method according to the first aspect of the invention become more remarkable when the first color and the second color are alternately allocated to each of the first pattern and the second pattern in the predetermined cycle.

In the position adjustment method for projection images according to the first aspect of the invention, it is preferable that the calculating including shifting at least one of the two adjustment images by pixel in the horizontal direction or vertical direction and calculating the evaluation values every time when the adjustment image is shifted by pixel.

In this case, the evaluation value can be calculated for each shift of the adjustment image by pixel. As a result, the position adjustment which is accurate by pixel can be achieved.

In the position adjustment method for projection images according to the first aspect of the invention, it is preferable that the patterns contain drawings of lines each having a width corresponding to one pixel.

Since the patterns contain drawings of lines each having a width corresponding to one pixel, the characteristic appearing due to the overlap of the patterns can be observed every time when the adjustment image is shifted by one pixel. As a result, the evaluation value by pixel can be appropriately calculated, and thus the position adjustment which is accurate by pixel can be achieved. Since the patterns of the two adjustment images are constituted by the drawings of lines each having the width corresponding to one pixel, both of the first color and second color are contained in each of the drawings of lines. It is preferable that the first color and the second color are alternately provided in the predetermined cycle.

In the position adjustment method for projection images according to the first aspect of the invention, it is preferable that the characteristic corresponds to pixel values in the image data.

Since the characteristic is represented by the pixel values, it is possible to use objective values for the indication of the characteristic.

In this case, it is preferable that the evaluation values correspond to the numbers of pixels having the pixel values equal to or larger than a threshold value. It is also preferable that the performing includes adjusting the positions of the two projection images while setting the optimum projection position for the two projection images at the position at which the number of pixels having the pixel values larger than the threshold value becomes the maximum.

By simply representing the evaluation values using the numbers of pixels equal to or larger than the threshold value and counting the numbers of pixels, the optimum projection position can be easily and appropriately determined. That is, the number of pixels equal to or larger than the threshold value increases as the degree of overlap of the two adjustment images increases. Thus, the optimum projection position can be easily and appropriately determined based on the number of pixels.

In this case, it is preferable that including setting the threshold value to a value corresponding to a color which is first exhibited when the patterns of the two adjustment images overlap with each other.

Since a color different from the colors of the two adjustment images appears due to the overlap of the respective patterns in the adjustment images, the degree of position adjustment can be visually recognized based on the changes in color.

In this case, it is preferable that the first color has relatively strong red component and relatively weak green component, and that the second color has relatively strong blue component and relatively weak green component. It is also preferable that the color first exhibited when the patterns of the two adjustment images overlap with each other is white.

For example, when the pixel values (gradation values) of the first color are R=255, G=128 and B=0 and the pixel values (gradation values) of the second color are R=0, G=128 and B=255, white color having the pixel values of the respective color components of R=255, G=255 and B=255 appears by the overlap of the first and second colors. The pixel value of G (green) is variable according to the illumination condition or the like since the luminance characteristic in the image data changes in some cases due to the effect of the gamma characteristics of the projectors and the image taking device, the illumination condition or the like.

In the position adjustment method for projection images according to the first aspect of the invention, it is preferable that the calculating including calculating the evaluation values after taking the two adjustment images several times with the two adjustment images located at the same correlated positions.

Since the evaluation values are calculated based on the image data obtained by taking several images, highly accurate evaluation values with reduced noise effect of the image taking device can be acquired. For example, an average of the evaluation values calculated from the image data obtained by taking several images may be determined as the required evaluation value.

In the position adjustment method for projection images according to the first aspect of the invention, it is preferable that the calculating and performing including executing the position adjustment for the two projection images by shifting the position of the effective image display region in the image forming area of an electro-optical modulator included in one of the two projectors by pixel.

In this case, the projection images can be shifted by pixel by using the function which has been originally provided in the projectors.

A position adjustment apparatus for projection images according to a second aspect of the invention adjusts positions of two projection images projected from two of plural projectors contained in a multi-projection display onto a projection surface such that the two projection images have an overlapping area by using two adjustment images one of which has a first pattern and the other of which has a second pattern. The position adjustment apparatus includes: an adjustment image data output device for setting pixel values of a first color and pixel values of a second color such that a predetermined characteristic is exhibited in the overlapping area when the two adjustment images are projected at appropriately correlated positions, producing two adjustment image data, corresponding to the two adjustment images, in which the first color and the second color are allocated to the first pattern and the second pattern such that the first color of the first pattern overlaps with the second color of the second pattern and such that the second color of the first pattern overlaps with the first color of the second pattern when the two adjustment images are projected at appropriately correlated positions, and giving the adjustment image data to the two projectors; an evaluation value calculation device for calculating evaluation values associated with the characteristic based on image data obtained by taking an image of the projection surface on which the two adjustment images corresponding to the two adjustment image data are projected from the two projectors; and a position adjustment control device for performing position adjustment for the two projection images based on the evaluation values.

The position adjustment apparatus for projection images offers advantages similar to those of the position adjustment method for projection images according to the first aspect of the invention. It is preferable that the position adjustment apparatus for projection images has characteristics similar to those of the position adjustment method for projection images according to the first aspect of the invention mentioned above.

A position adjustment program for projection images according to a third aspect of the invention adjusts positions of two projection images projected from two of plural projectors contained in a multi-projection display onto a projection surface such that the two projection images have an overlapping area by using two adjustment images one of which has a first pattern and the other of which has a second pattern. The position adjustment program for projection images is capable of executing: a first step for setting pixel values of a first color and pixel values of a second color such that a predetermined characteristic is exhibited in the overlapping area when the two adjustment images are projected at appropriately correlated positions, producing two adjustment image data, corresponding to the two adjustment images, in which the first color and the second color are allocated to the first pattern and the second pattern such that the first color of the first pattern overlaps with the second color of the second, pattern and such that the second color of the first pattern overlaps with the first color of the second pattern when the two adjustment images are projected at appropriately correlated positions, and giving the adjustment image data to the two projectors; a second step for calculating evaluation values associated with the characteristic based on image data obtained by taking an image of the projection surface on which the two adjustment images corresponding to the two adjustment image data are projected from the two projectors; and a third step for performing position adjustment for the two projection images based on the evaluation values.

The position adjustment program for projection images offers advantages similar to those of the position adjustment method for projection images according to the first aspect of the invention. It is preferable that the position adjustment program for projection images has characteristics similar to those of the position adjustment method for projection images according to the first aspect of the invention mentioned above.

A multi-projection display according to a fourth aspect of the invention which has a plurality of projectors and is capable of projecting projection images from the plural projectors onto a projection surface such that the projection images have overlapping areas. The multi-projection display includes: an adjustment image data output device for setting pixel values of a first color and pixel values of a second color such that a predetermined characteristic is exhibited in the overlapping area when an adjustment image having a first pattern and an adjustment image having a second pattern both from two of the plural projectors are projected at appropriately correlated positions, producing two adjustment image data, corresponding to the two adjustment images, in which the first color and the second color are allocated to the first pattern and the second pattern such that the first color of the first pattern overlaps with the second color of the second pattern and such that the second color of the first pattern overlaps with the first color of the second pattern when the two adjustment images are projected at appropriately correlated positions, and giving the adjustment image data to the two projectors; an evaluation value calculation device for calculating evaluation values associated with the characteristic based on image data obtained by taking an image of the projection surface on which the two adjustment images corresponding to the two adjustment image data are projected from the two projectors; and a position adjustment control device for performing position adjustment for the two projection images based on the evaluation values.

Since the multi-projection display containing the plural projectors has this structure for executing position adjustment, highly accurate position adjustment can be performed in an extremely dark environment considering the effect of the inhibiting factors. It is preferable that the multi-projection display has characteristics similar to those of the position adjustment method for projection images according to the first aspect of the invention mentioned above.

It is preferable that the multi-projection display according to the fourth aspect of the invention is capable of projecting images onto a projection surface by tiling projection such that a plurality of projection images from the plural projectors can have overlapping areas.

In the multi-projection display which provides projection images from the plural projectors by tiling projection such that the adjoining projection images have an overlapping area, highly accurate position adjustment can be performed in an extremely dark environment such as a darkroom considering the effect of the inhibiting factors.

It is preferable that the multi-projection display according to the fourth aspect of the invention is capable of projecting images onto a projection surface by stacking projection such that a plurality of projection images from the plural projectors can have overlapping areas.

In the multi-projection display which provides projection images from the plural projectors by so-called stacking projection such that the projection images are stacked in the same projection area, highly accurate position adjustment can be performed in an extremely dark environment such as a darkroom considering the effect of the inhibiting factors.

BRIEF DESCRIPTION OF THE DRAWINGS

The invention will be described with reference to the accompanying drawings, wherein like numbers refer to like elements.

FIGS. 7A and 7B schematically illustrate adjustment images CG3 and CG4 separately projected from the projectors PJ1 and PJ2 onto the screen SCR, respectively, to perform position adjustment in the horizontal direction.

FIG. 8 schematically illustrates the conditions of the adjustment images CG3 and CG4 projected on the screen SCR with an overlapping area in a part of the adjustment images CG3 and CG4.

FIGS. 13A and 13B schematically show adjustment images CG13 and CG14 used in a "second projection image position adjustment".

FIGS. 14A and 14B illustrate examples of adjustment images CG13 and CG14 separately projected from the projectors PJ1 and PJ2 onto the screen SCR, respectively.

FIG. 15 schematically illustrates the conditions of the adjustment images CG13 and CG14 projected on the screen SCR with an overlapping area in a part of the adjustment images CG13 and CG14.

FIGS. 21A and 21B schematically illustrate adjustment images CG11 and CG12 used for position adjustment performed in the vertical direction in the "second projection image position adjustment".

FIGS. 22A and 22B schematically illustrate the adjustment images CG11 and CG12 separately projected on the screen SCR.

FIG. 23 schematically illustrates the conditions of the adjustment images CG11 and CG12 projected on the screen SCR with an overlapping area in a part of the adjustment images CG11 and CG12.

DESCRIPTION OF EXEMPLARY EMBODIMENTS

An embodiment according to the invention is hereinafter described. The technique of the invention is to achieve appropriate position adjustment for projection images in an extremely dark environment having little illumination such as a darkroom. However, before referring to position adjustment for projection images according to the invention, position adjustment for projection images under the illumination condition where predetermined brightness is provided is first discussed. In the following embodiment, the position adjustment for projection images performed under the illumination condition of the predetermined brightness is referred to as "first projection image position adjustment", while the position adjustment for projection images performed under the extremely dark environment such as a darkroom is referred to as "second projection image position adjustment".

First Projection Image Position Adjustment

Figure 1:
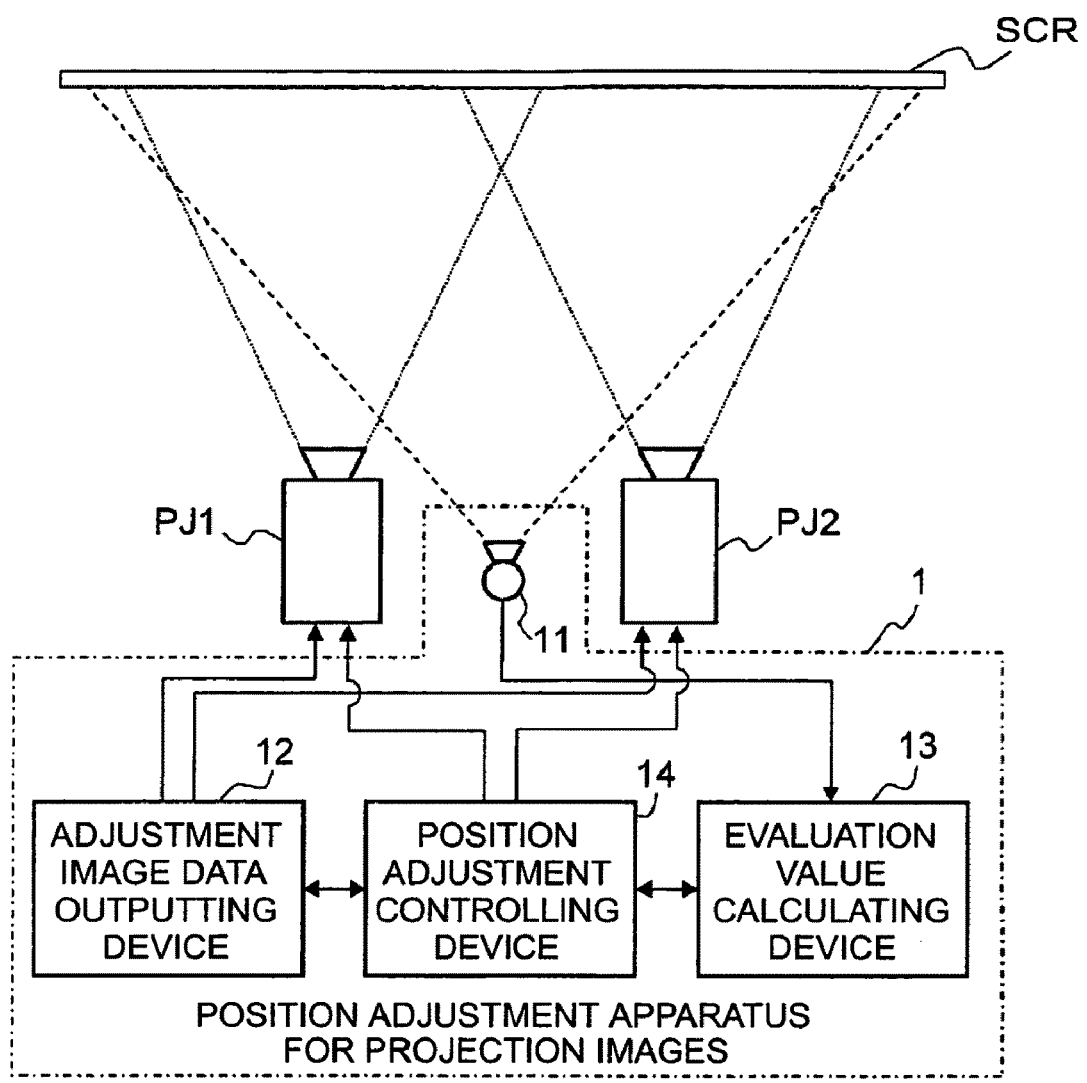
FIG. 1 illustrates a structure of a multi-projection display using a position adjustment method for projection images in an embodiment according to the invention.

FIG. 1 illustrates a structure of a multi-projection display which performs the "first projection image position adjustment". A multi-projection display shown in FIG. 1 includes a pair of left and right projectors PJ1 and PJ2 located side by side in the horizontal direction. The respective projectors PJ1 and PJ2 are disposed in such positions as to project images on a screen SCR as a projection screen by tiling projection with an overlapping area in a part of the projection images. FIG. 1 shows the screen SCR and the projectors PJ1 and PJ2 as viewed from above.

The multi-projection display includes the two projectors PJ1 and PJ2 and a position adjustment apparatus 1 having a function of adjusting positions of projection images projected from the two projectors PJ1 and PJ2.

The projectors PJ1 and PJ2 can internally shift the display positions of the projection images on the screen SCR by pixel in the horizontal and vertical directions by control from the outside. When the display positions of the images cannot be shifted by control from the outside, display images shifted by pixel in the horizontal and vertical directions by an image data output device (such as personal computer) are given to the projectors PJ1 and PJ2.

The position adjustment apparatus 1 for projection images includes an image taking device 11 capable of taking adjustment images CG1 and CG2 projected on the screen SCR by tiling projection with an overlapping area in a part of each of the images CG1 and CG2, adjustment image data outputting device 12 capable of outputting adjustment image data CGD1 and CGD2 corresponding to the adjustment images CG1 and CG2 to the projectors PJ1 and PJ2, an evaluation value calculating device 13 for calculating evaluation values for the adjustment images based on the image data obtained from the image taking device 11, and a position adjustment controlling device 14 for obtaining the optimum projection positions of the projection images from the projectors PJ1 and PJ2 based on the evaluation results given from the evaluation value calculating device 13 to adjust the positions of the projection images based on the optimum projections thus obtained.

In the "first projection image position adjustment", one of the two adjustment images CG1 and CG2 (adjustment image CG1 projected by the projector PJ1 in this example) is fixed, and the other adjustment image (adjustment image CG2 projected by the projector PJ2 in this example) is shifted in the vertical direction (up-and-down direction) with respect to the screen SCR, so as to detect the optimum projection position.

Figure 2:
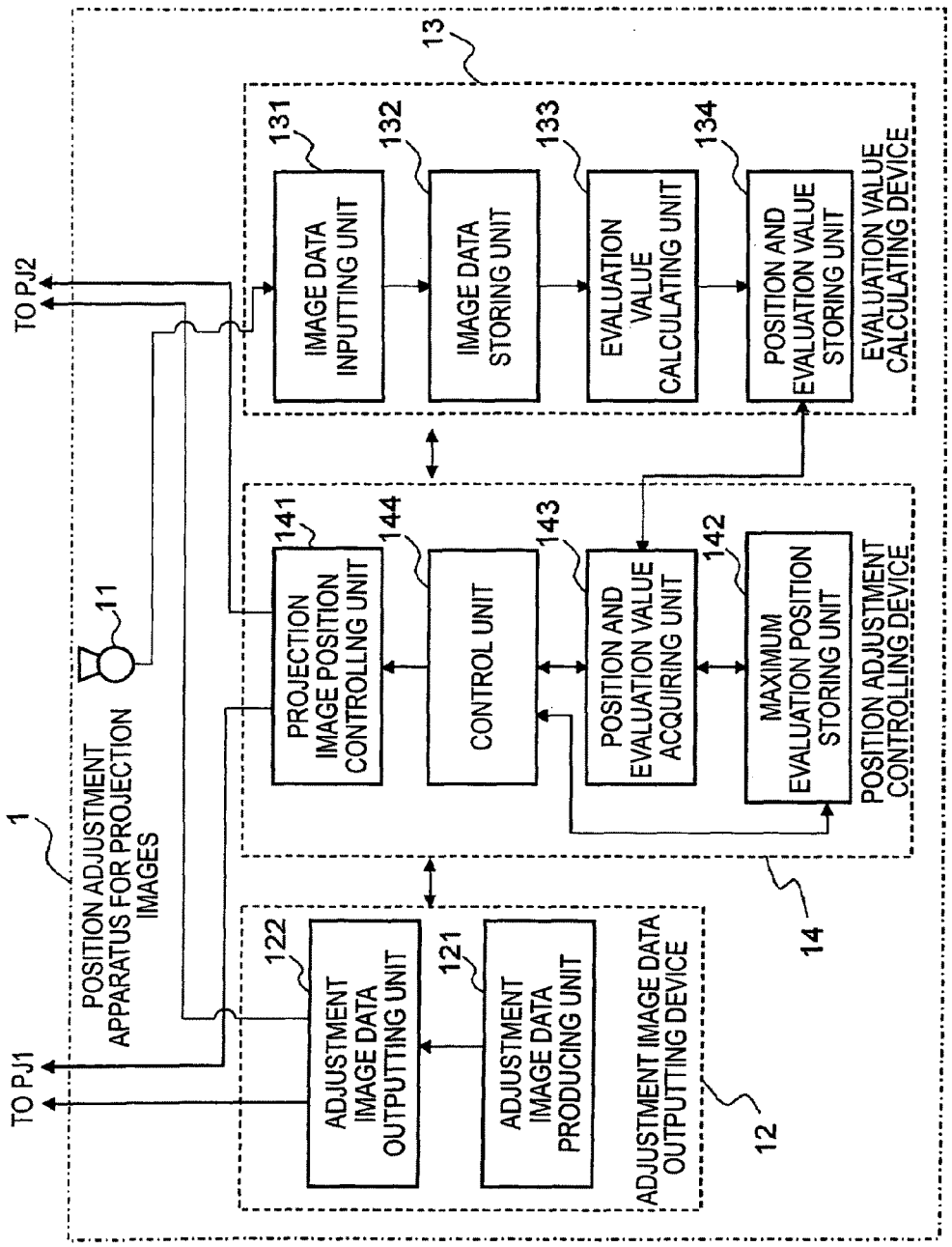
FIG. 2 shows the details of a position adjustment apparatus 1 for projection images.

FIG. 2 illustrates the detailed structure of the position adjustment apparatus 1 for projection images. The adjustment image data outputting device 12 has an adjustment image data producing unit 121 for producing the adjustment image data CGD1 and CGD2 corresponding to the projectors PJ1 and PJ2, respectively, and an adjustment image data outputting unit 122 for outputting the produced adjustment image data CGD1 and CGD2 to the corresponding projectors PJ1 and PJ2.

The image taking device 11 takes the adjustment images CG1 and CG2 projected from the projectors PJ1 and PJ2 onto the screen SCR in correspondence with the adjustment image data CGD1 and CGD2, and outputs the image data thus obtained. The image taking device 11 may be an image taking device having lower resolution than that of the projection images projected on the screen SCR.

The evaluation value calculating device 13 has an image data inputting unit 131 for inputting image data obtained by taking the adjustment images CG1 and CG2 on the screen SCR using the image taking device 11, an image data storing unit 132 for storing the inputted image data, an evaluation value calculating unit 133 for calculating evaluation values (details will be described later) based on the correlated positions of the adjustment images CG1 and CG2, and a position and evaluation value storing unit 134 for storing the shifted positions of the adjustment image CG2 and the calculated evaluation values with correspondence between the positions of the adjustment image CG2 and the evaluation values.

The position adjustment controlling device 14 has a projection image position controlling unit 141 capable of shifting the positions of the projection images from the projectors PJ1 and PJ2 by pixel, a position and evaluation value acquiring unit 143 for inputting the positions and evaluation values associated with the positions stored in the position and evaluation value storing unit 134 of the evaluation value calculating device 13, acquiring the maximum evaluation value of the inputted evaluation values and the position associated with the maximum evaluation value (referred to as the maximum evaluation position), and storing the maximum evaluation position associated with the acquired maximum evaluation value in a maximum evaluation position storing unit 142, and a control unit 144 for giving shift control information to the projection image position controlling unit 141 based on the maximum evaluation value and the maximum evaluation position for the maximum evaluation value acquired by the position and evaluation value acquiring unit 143.

Figure 3A:
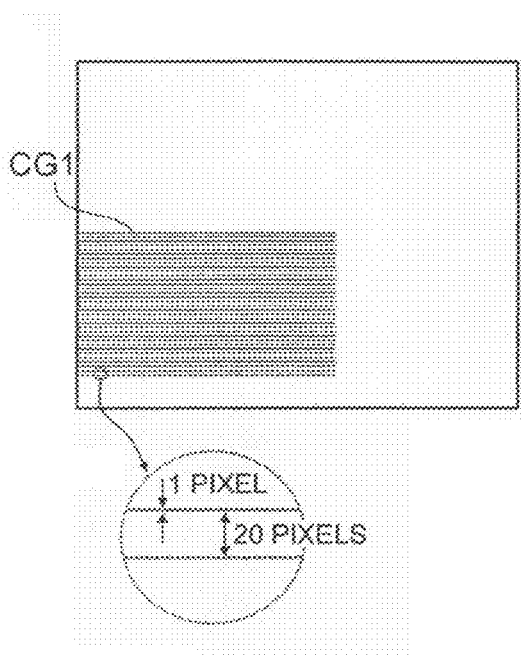
FIGS. 3A and 3B schematically show examples of adjustment images CG1 and CG2 separately projected from projectors PJ1 and PJ2 onto a screen SCR, respectively.
Figure 3B:
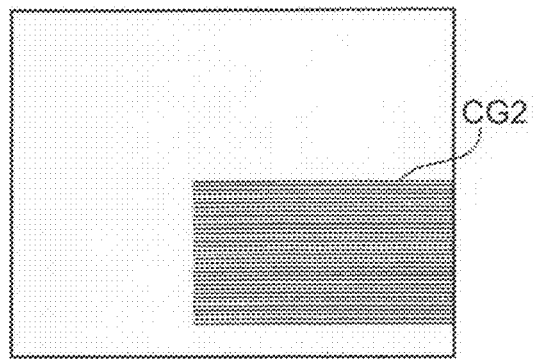

FIGS. 3A and 3B schematically show examples of the adjustment images CG1 and CG2, respectively, which are separately projected on the screen SCR from the projectors PJ1 and PJ2. The adjustment images CG1 and CG2 shown in FIGS. 3A and 3B are adjustment images used for position adjustment for the respective images on the screen SCR projected from the projectors PJ1 and PJ2.

As explained above, the adjustment images CG1 and CG2 are produced as adjustment images corresponding to the two projectors PJ1 and PC2, respectively, and the produced two adjustment images are given to the corresponding projectors PJ1 and PJ2. However, one adjustment image may be produced and divided into two parts each of which is to be given to the corresponding projectors PJ1 and PJ2. This applies to the adjustment images used in the "second projection image position adjustment" which will be described later.

The adjustment images CG1 and CG2 have patterns which exhibit a predetermined characteristic in the overlapping area of the adjustment images CG1 and CG2 when the images CG1 and CG2 are projected on the screen SCR at appropriately correlated positions.

More specifically, in the two adjustment images CG1 and CG2, the adjustment image CG1 has a first pattern having a first color, and the other adjustment image CG2 has a second pattern having a second color. The pixel values of the red component, green component and blue component in each of the two adjustment images are determined such that the first and second colors exhibit a characteristic of white color when the first and second patterns overlap with each other.

For example, the first color of the adjustment image CG1 has a relatively strong red component and a relatively weak green component, while the second color of the adjustment image CG2 has a relatively strong blue component and a relatively weak green component. More specifically, for the first color of the adjustment image CG1, the pixel values (gradation values) of the color components of R (red), G (green) and B (blue) are determined as R=255, G=160, B=0. For the second color of the adjustment image CG2, the pixel values (gradation values) of the color components of R (red), G (green) and B (blue) are determined as R=0, G=160, B=255. The background color is preferably black. In this embodiment, the pixel values indicate the luminance values.

For establishing the pixel values in the overlapping area of the adjustment images CG1 and CG2 as a white color (R=255, G=255, B=255), the ideal G (green) component of the adjustment images CG1 and CG2 should be 128. Actually, the luminance characteristics of the image data varies in some cases due to the effect of the gamma characteristics of the projectors PJ1 and PJ2 and the image taking device, the illumination condition or the like. In this embodiment, therefore, G (green) is set at 160. The value of G (green) may be appropriately established according to the conditions or the like in each case.

In this embodiment, the pixel values of R and B are fixed at, 255 or 0 and the value G is variably established at an optimum value. However, the pixel values of G and B may be fixed at 255 or 0 and the value R may be variably established at an optimum value, or the pixel values of R and G may be fixed at 255 or 0 and the value B may be variably established at an optimum value. Since an image taking device is generally highly sensitive to G (green), it is preferable to variably determine the value G (green) at an optimum value.

The respective patterns of the adjustment images CG1 and CG2 (the first pattern and second pattern) are constituted by a plurality of straight lines produced by line drawing in the horizontal direction. As illustrated in the enlarged view within a frame shown by a broken line in FIG. 3A, the width (thickness) of the respective lines corresponds to one pixel of electro-optical modulators (called liquid crystal modulators) of the projectors PJ1 and PJ2, and the clearance between the respective lines corresponds to 20 pixels of the liquid crystal modulators of the projectors PJ1 and P32.

Next, the "first projection image position adjustment" is discussed. It is assumed herein that the resolution of the respective liquid crystal modulators of the projectors PJ1 and PJ2 are horizontal 1,280 pixels×vertical 720 pixels, and that the resolution of the image taking device is horizontal 1,280 pixels×vertical 1,024 pixels.

Initially, position adjustment for the two adjustment images CG1 and CG2 is manually conducted by the user to a possible extent by manual adjustment. The position set by the position adjustment through the user's manual operation is referred to as the initial position.

The fine adjustment required from the initial position to the final adjustment is effected by the processes of the "first projection image position adjustment" to determine the optimum projection position. The procedures for the position adjustment of the "first projection image position adjustment" are now explained.

First, the adjustment image data outputting device 12 outputs the adjustment image data CGD1 to the projector PJ1 which projects the projection image positioned on the left part of the screen SCR, and outputs the adjustment image data CGD2 to the projector PJ2 which projects the projection image positioned on the right part of the screen SCR. In the adjustment image data CGD1 and CGD2, the adjustment image data CGD1 has the pixel values of R=255, G=160 and B=0, and the adjustment image data CGD2 has the pixel values of R=0, G=160, and B=255.

Figure 4:
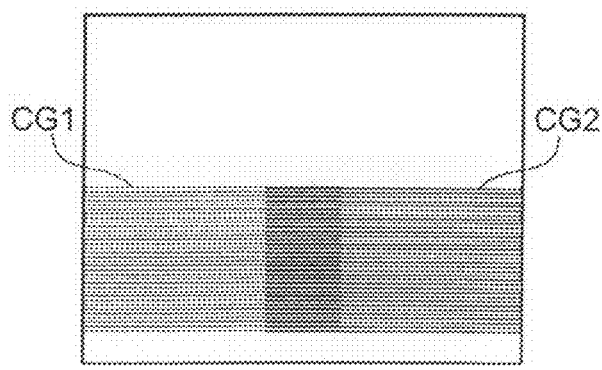
FIG. 4 schematically illustrates the conditions of the adjustment images CG1 and CG2 projected on the screen SCR with an overlapping area in a part of the adjustment images CG1 and CG2.

FIG. 4 schematically illustrates the adjustment images CG1 and CG2 shown in FIGS. 3A and 3B, which are projected on the screen SCR with an overlapping area in a part of the adjustment images CG1 and CG2. As illustrated in FIG. 4, the adjustment image CG1 having the pixel values of R=255, G=160 and B=0 from the projector PJ1 and the adjustment image CG2 having the pixel values of R=0, G=160 and B=255 from the projector PJ2 are projected on the screen SCR with the overlapping area in a part of the adjustment images CG1 and CG2. FIG. 4 shows the conditions of the adjustment images CG1 and CG2 before position adjustment is conducted.

After the adjustment images CG1 and CG2 are projected on the screen SCR, the position of either the adjustment image CG1 or CG2 is shifted by pixel in the vertical direction. As discussed above, the adjustment image CG1 is fixed and the adjustment image CG2 is shifted by pixel in this embodiment. The movement of the adjustment images by pixel can be easily conducted by using a function of the liquid crystal modulator of the projector for shifting the position of the effective image display region in the image forming area by pixel.

It is assumed that the adjustment image CG2 from the projector PJ2 is located at a position (referred to as process starting position) which is shifted by 10 pixels in the vertical direction (upward direction in this example) from the initial position set by the position adjustment through the manual operation.

The process for sequentially moving the adjustment image CG2 by pixel in the downward direction from the process starting position to shift the image CG2 by 20 pixels in total is now explained.

As discussed above, the process starting position is the position where the adjustment image CG2 projected from the projector PJ2 is shifted by 10 pixels in the vertical direction from the initial position set by the manual operation. The adjustment image CG2 is shifted by 20 pixels from the process starting position, because the initial position established by the manual operation is accurate to some extent and it is highly possible that the optimum projection position exists within the area of about 10 pixels in the upward and downward directions from the initial position. By this operation, the optimum projection position can be found more efficiently.

Figure 5:
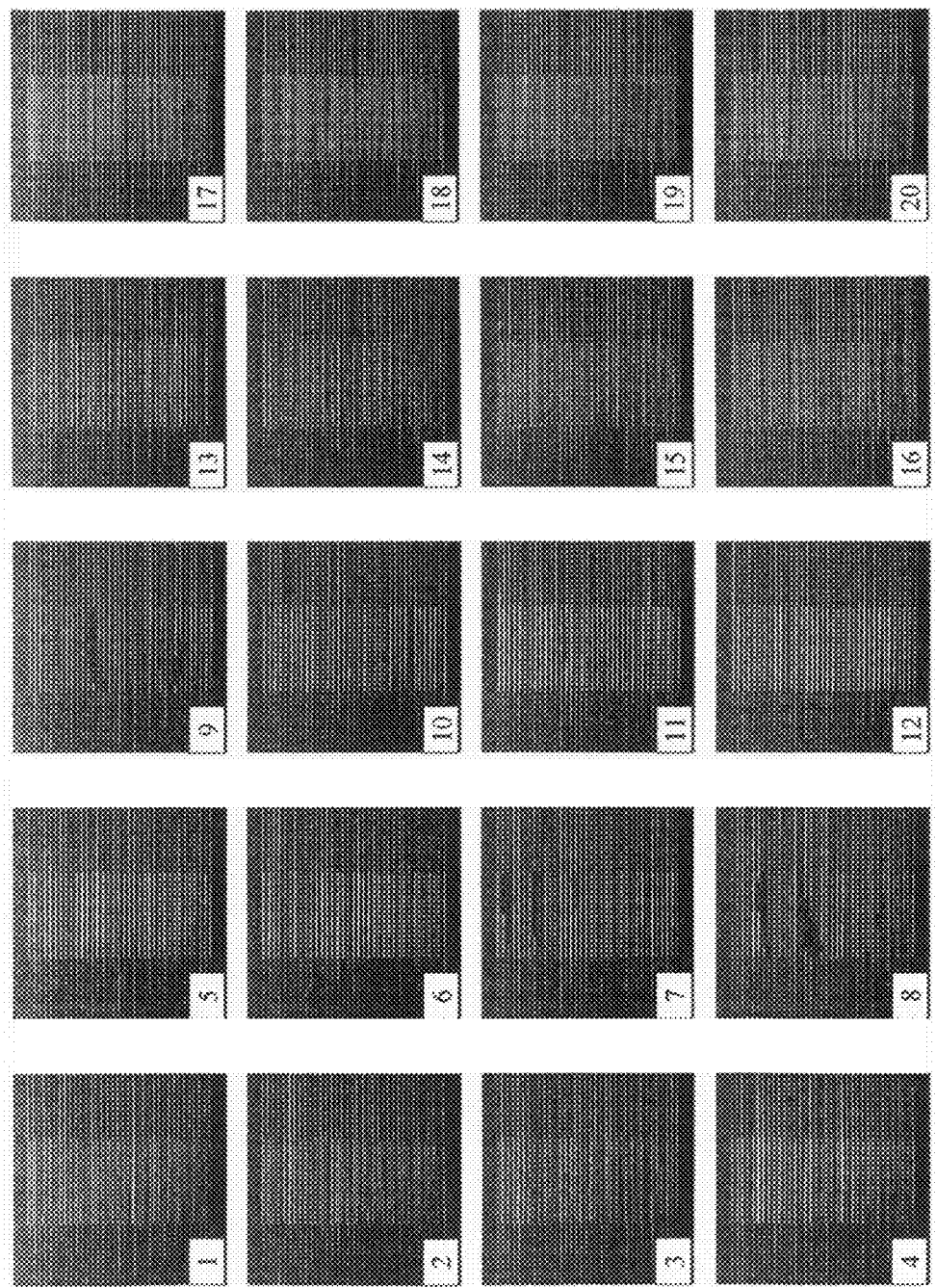
FIG. 5 shows an enlarged overlapping area of the adjustment images CG1 and CG2 in image data from an image taking device 11 at each position of the adjustment image CG2.

FIG. 5 illustrates enlarged overlapping areas of the adjustment images CG1 and CG2 shown in the image data obtained by the image taking device 11 at the respective positions of the adjustment image CG2. Each of the images in FIG. 5 shows the conditions of the adjustment images CG1 and CG2 at the corresponding position when the adjustment image CG2 is sequentially shifted by pixel in the downward direction from the process starting position to move the image CG2 by 20 pixels in total. In FIG. 5, the numbers of 1 through 20 shown at the lower left corner of each image correspond to the respective positions of the adjustment image CG2 when the adjustment image CG2 is shifted by 20 pixels from the process starting position, and the position "1" indicates the process starting position.

The image taking device 11 takes the adjustment images CG1 and CG2 on the screen SCR with the adjustment image CG2 shifted by pixel, and outputs the image data thus obtained. The image data is inputted to the image data inputting unit 131, and stored in the image data storing unit 132. Then, the evaluation value calculating unit 133 calculates evaluation value for each position of the adjustment image CG2 shifted by pixel based on the image data stored in the image data storing unit 132. The evaluation values are calculated by the following method.

As illustrated in FIG. 5, when the adjustment image CG2 is shifted by pixel so that the positions of the adjustment images CG1 and CG2 have a predetermined correlation, a characteristic which is not exhibited in the original adjustment images CG1 and CG2 appears in the overlapping area of the adjustment images CG1 and CG2. This characteristic appearing in the overlapping area of the adjustment images CG1 and CG2 is a change in the pixel values in the image data caused due to the overlap of the respective lines in the adjustment images CG1 and CG2. When both the images appropriately overlap with each other, white color appears in the overlapping area.

Since FIG. 5 is a monochrome figure, it is difficult to recognize appearance of white color from FIG. 5. However, it is actually easy to recognize this appearance from the color images which are the original images of FIG. 5. It is easier to recognize appearance of white color in the color images on the display when white having the pixel values which have reached a predetermined threshold value (threshold value will be described later) in the overlapping area of the adjustment images CG1 and CG2 is indicated in pink.

Though not easily recognizable from FIG. 5, a white region begins to appear from the image at the position "6". This white region becomes the maximum in the image at the position "8". Then, the white region rapidly decreases from the position "9" to the later positions, as apparent from FIG. 6 which will be explained later.

In FIG. 5, it is possible to determine that the positions of the adjustment images CG1 and CG2 are appropriately correlated at the position "8". The determination that the correlated positions of the adjustment images CG1 and CG2 are appropriate can be established according to the number of pixels determined as white based on the image data.

In this case, whether the region is white or not is judged based on the determination whether the pixel value of each pixel is a threshold value or larger. More specifically, the ideal pixel values for white are R, G, B=(255, 255, 255), but the pixel values as threshold are set at R, G, B=(240, 240, 240) in the "first projection image position adjustment" (also in the "second projection image position adjustment" to be described later), for example. Thus, the pixel values R, G, B=(240, 240, 240) or larger are determined as white.

The threshold value is set not as R, G, B=(255, 255, 255) but as R, G, B=(240, 240, 240), because a certain margin is provided considering variations caused due to device characteristics such as gamma characteristic or the illumination condition.

Figure 6:
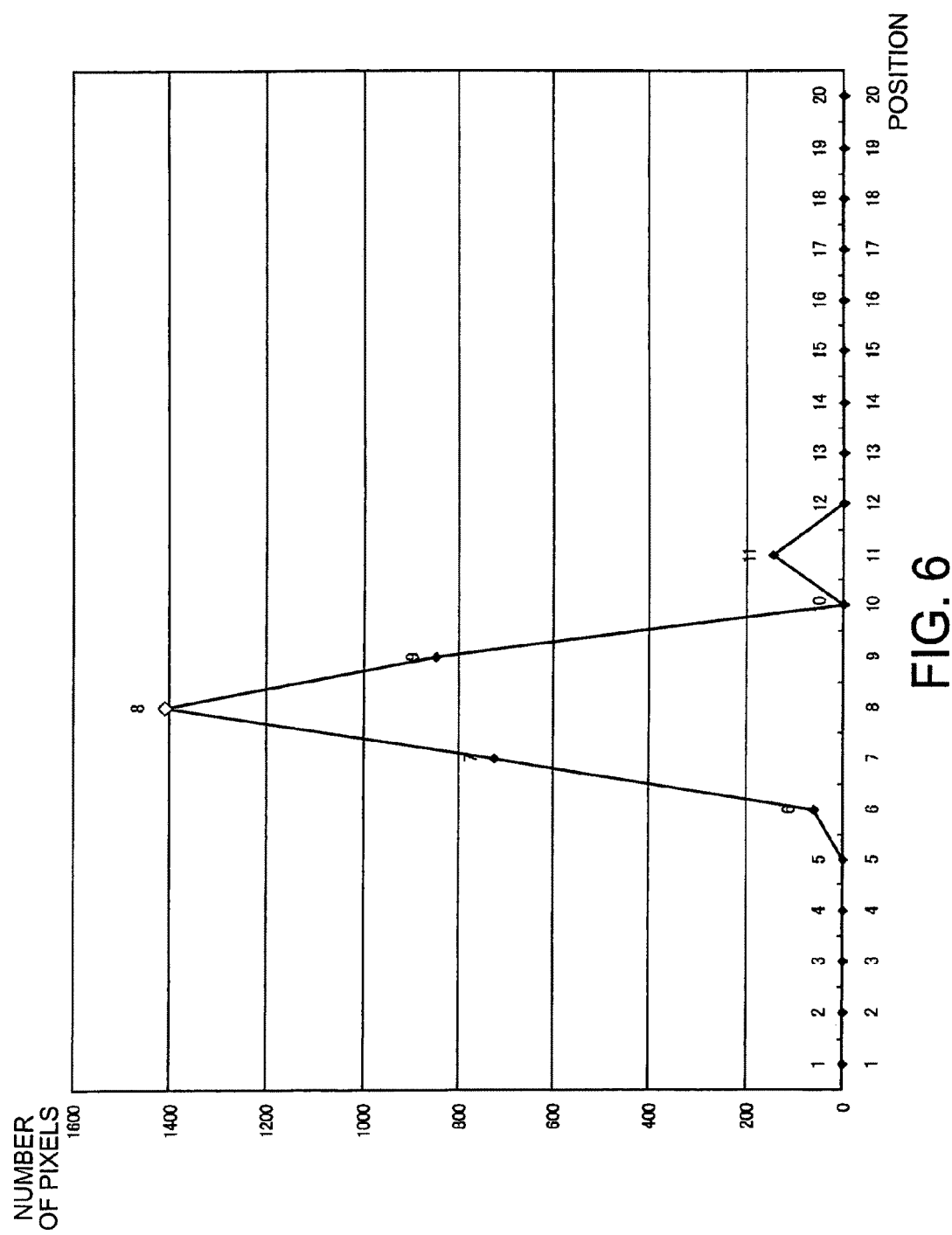
FIG. 6 shows the number of pixels determined as white at each position from the process starting position "1" to the position "20" shifted by 20 pixels from the process starting position "1".

FIG. 6 shows the numbers of pixels judged as white in the respective images shifted from the process starting position "1" to the position "20" shifted therefrom by 20 pixels. As apparent from FIG. 6, the number of pixels judged as white becomes the maximum at the position "8". The number of pixels for each position in FIG. 6 is calculated by the evaluation value calculating unit 133 shown in FIG. 2, and the calculated numbers of pixels are stored in the position and evaluation value storing unit 134 of the evaluation value calculating device 13 in FIG. 2 while associated with the corresponding positions.

Then, the position and evaluation value acquiring unit 143 of the position adjustment controlling device 14 acquires the position corresponding to the maximum number of pixels as the maximum evaluation position based on the data stored in the position and evaluation value storing unit 134 of the evaluation value calculating device 13, and stores the acquired maximum evaluation position in the maximum evaluation position storing unit 142. Since the position "8" is the maximum evaluation position corresponding to the maximum number of pixels in this case, the position "8" is stored in the maximum evaluation position storing unit 142 as the maximum evaluation position.

More specifically, FIG. 6 shows that the respective lines of the adjustment image CG1 and the respective lines of the adjustment image CG2 overlap with each other at the appropriately correlated positions in the vertical direction when the adjustment image CG2 is located at the position "8". Thus, when images from the projectors PJ1 and PJ2 are projected at these correlated positions, the respective projection images come to the optimum projection positions in the vertical direction.

Thus, position adjustment is conducted such that the maximum evaluation position coincides with the position of the projection image of the projector PJ2. By this adjustment, the respective projection images from the projectors PJ1 and PJ2 come to the optimum projection positions under appropriate position control in the vertical direction, displaying high-quality images having neither discontinuous joints nor blurs in the overlapping area.

The resolution of the image taking device 11 shown in FIG. 1 is set as horizontal 1,280 pixels×1,024 pixels. Though the image taking device used has relatively low resolution of about 1 million pixels, position adjustment for projection images having resolution (resolution of images per one projector is horizontal 1,280 pixels×720 pixels in this example) higher than the resolution of the image taking device can be performed by pixel.

The above example is the case where position adjustment for the projection images from the two projectors PJ1 and PJ2 disposed side by side in the horizontal direction is performed in the vertical direction. Next, another example in which position adjustment for the projection images from the two projectors PJ1 and PJ2 disposed side by side in the horizontal direction is performed in the horizontal direction is discussed.

FIGS. 7A and 7B schematically illustrate adjustment images CG3 and CG4 separately projected from the projectors PJ1 and PJ2 onto the screen SCR, which images are used for position adjustment in the horizontal direction. Similarly to the case of the adjustment images CG1 and CG2, the adjustment images CG3 and CG4 have such patterns that the predetermined characteristic appears in the overlapping area of the images CG3 and CG4 when the images CG3 and CG4 are projected at appropriately correlated positions on the screen SCR. In this example, the patterns of the adjustment images CG3 and CG4 are constituted by drawings of lines in the vertical direction. The thickness (width) of the lines, the clearance between the lines and the like are similar to those in the adjustment images CG1 and CG2 (see a figure within a frame shown by a broken line in FIG. 7A).

FIG. 8 schematically illustrates the conditions of the adjustment images CG3 and CG4 projected on the screen SCR with an overlapping area in a part of the adjustment images CG3 and CG4. As illustrated in FIG. 8, the adjustment image CG3 having the pixel values R=255, G=160 and B=0 projected from the projector PJ1, and the adjustment image CG4 having the pixel values R=0, G=160 and B=255 projected from the projector PJ2 are projected on the screen SCR with the overlapping area in a part of the adjustment images CG3 and CG4. FIG. 8 shows the conditions of the adjustment images CG3 and CG4 before position adjustment.

Similarly to the case of position adjustment in the vertical direction, one (adjustment image CG3 projected by the projector PJ1 in this example) of the two adjustment images CG3 and CG4 is fixed, and the other adjustment image (adjustment image CG4 projected by the projector PJ2 in this example) is shifted in the horizontal direction (left-and-right direction) with respect to the screen SCR to detect the optimum projection position in the position adjustment performed in the horizontal direction.

In the position adjustment in the horizontal direction, the process starting position of the adjustment image CG4 from the projector PJ2 is set at a position shifted by 10 pixels in the horizontal direction (left direction) from the initial condition of the adjustment images CG3 and CG4 from the projectors PJ1 and PJ2 after the position adjustment by the user's manual operation to a possible extent, and the adjustment image CG4 is sequentially shifted by pixel from the process starting position in the right direction to move the adjustment, image CG4 by 20 pixels in total.

Then, the image taking device 11 takes the adjustment images CG3 and CG4 on the screen SCR, and outputs the image data thus obtained. The image data is inputted to the image data inputting unit 131 shown in FIG. 2, and stored in the image data storing unit 132. The evaluation value calculating unit 133 calculates the evaluation value for each position of the adjustment image CG4 shifted by pixel based on the image data stored in the image data storing unit 132. The method for calculating the evaluation values is similar to that in the case of the position adjustment in the vertical direction.

Figure 9:
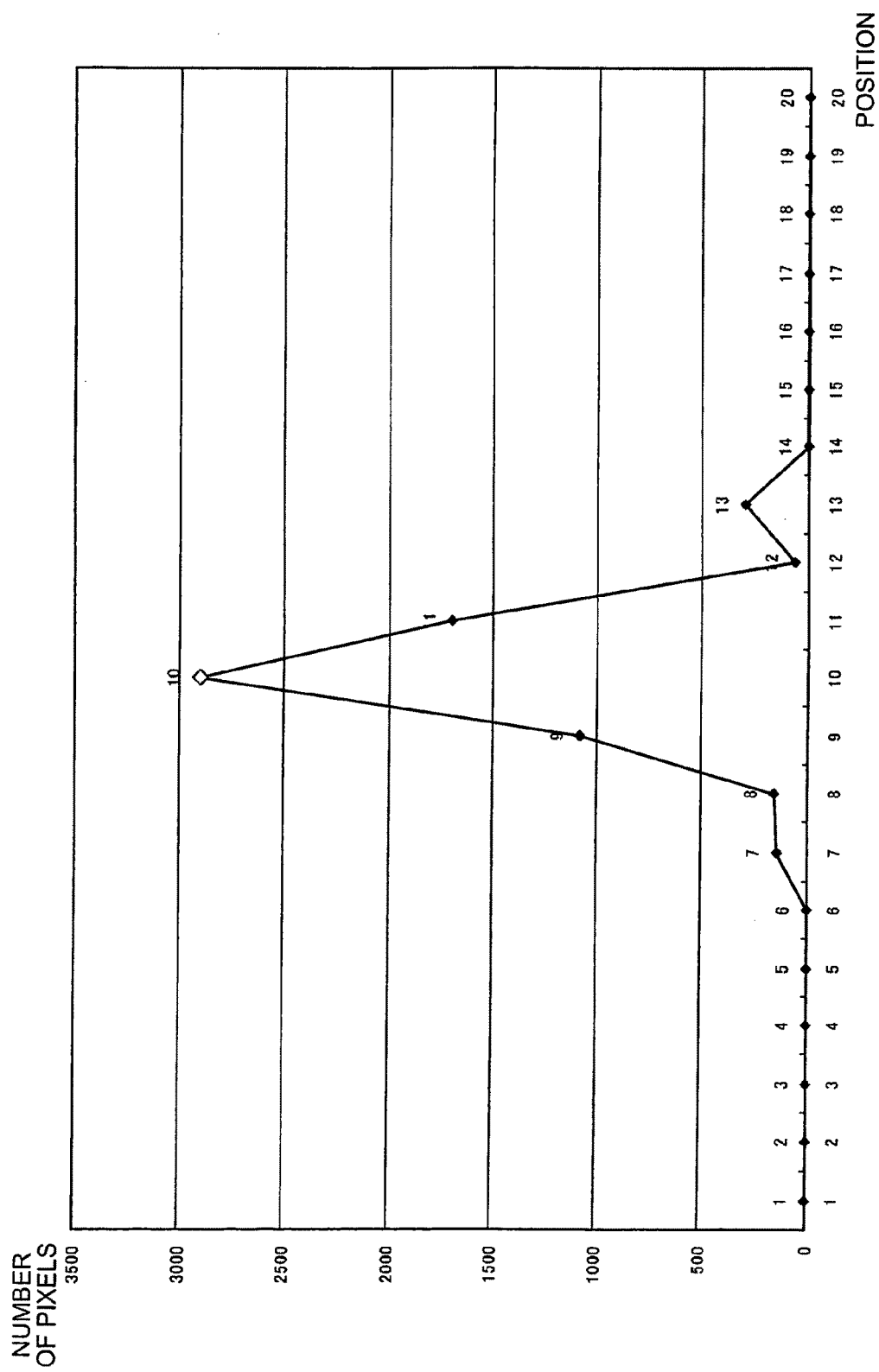
FIG. 9 shows the number of pixels determined as white at each position from the process starting position "1" to the position "20" shifted by 20 pixels from the process starting position "1".

FIG. 9 shows the number of pixels determined as white at each position from the process starting position "1" to the position "20" shifted therefrom by 20 pixels. In the case of FIG. 9, the number of pixels determined as white becomes the maximum at the position "10". Thus, the case of FIG. 9 shows that the condition of the adjustment images CG3 and CG4 projected from the projectors PJ1 and PJ2 after the position adjustment by the user's manual operation to the possible extent is finally judged as the optimum projection position.

As explained above, the position adjustment for the projection images from the two projectors PJ1 and PJ2 disposed side by side in the horizontal direction can be performed in the vertical direction with high accuracy by using the adjustment images CG1 and CG2, and the position adjustment for those projecting images can be performed in the horizontal direction with high accuracy by using the adjustment images CG3 and CG4.

The above examples are the cases where the position adjustments for the projection images from the two projectors PJ1 and PJ2 disposed side by side in the horizontal direction are conducted in the vertical direction and horizontal direction in the "first projection image position adjustment". However, position adjustment for projection images from the two projectors PJ1 and PJ2 disposed side by side in the vertical direction can be performed in the vertical direction by using the adjustment images CG1 and CG2, and also position adjustment for projection images from the two projectors PJ1 and PJ2 disposed side by side in the vertical direction can be performed in the horizontal direction by using the adjustment images CG3 and CG4.

These position adjustments in the vertical and horizontal directions for the projection images projected from the projectors PJ1 and PJ1 disposed side by side in the vertical direction are not explained in the "first projection image position adjustment".

Second Projection Image Position Adjustment

In the "first projection image position adjustment" having been discussed, preferable results can be obtained under the illumination condition where predetermined brightness is provided. In an extremely dark environment, however, appropriate position adjustment cannot be achieved in some cases. In this example, position adjustment for the projection images from the two projectors PJ1 and PJ2 disposed side by side in the horizontal direction is conducted in the horizontal direction.

Figure 10:
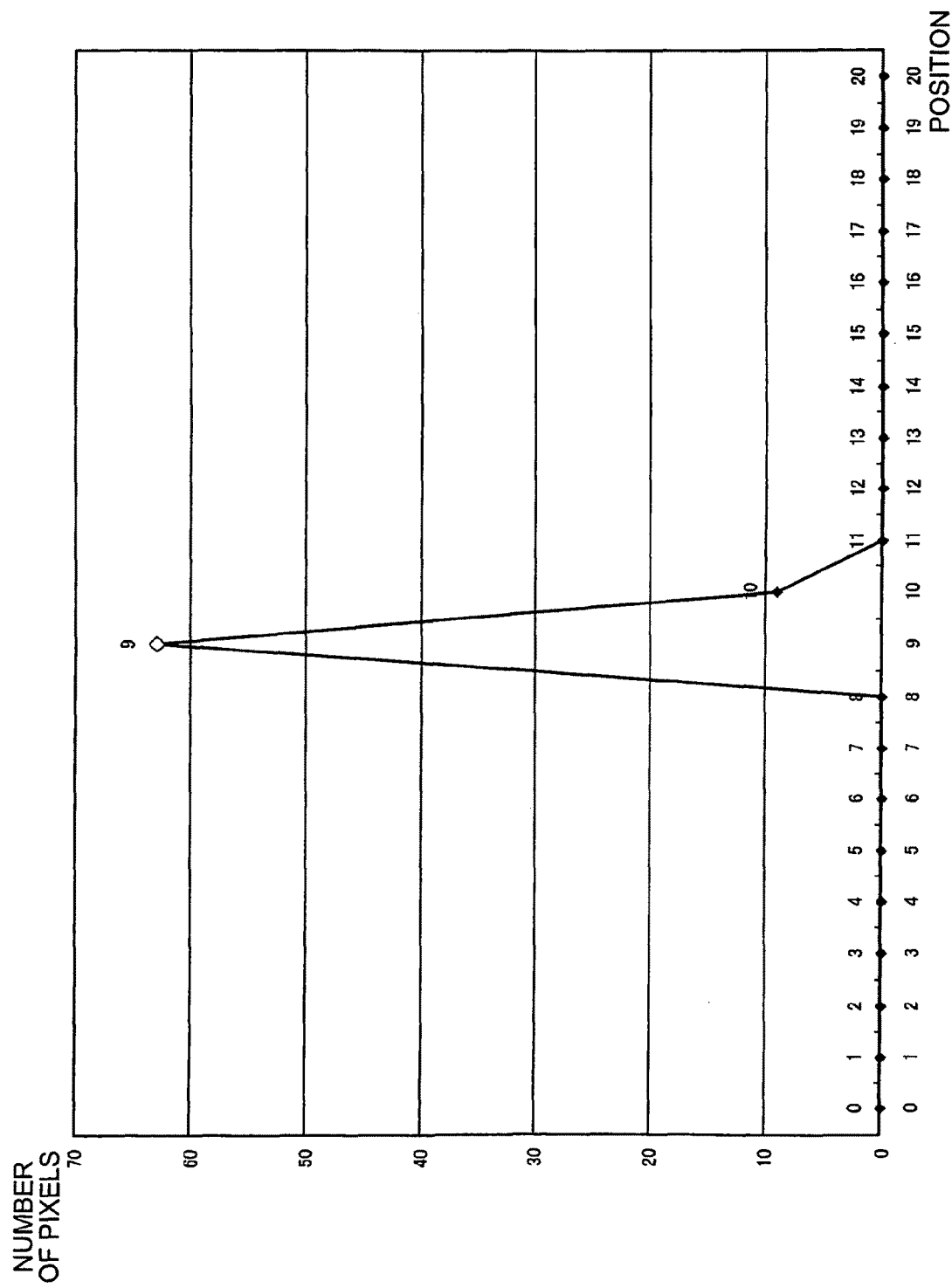
FIG. 10 shows the number of pixels determined as white at each position from the process starting position "1" to the position "20" shifted by 20 pixels from the process starting position "1" in an extremely dark environment.

FIG. 10 shows the number of pixels determined as white at each position from the process starting position "1" to the position "20" shifted therefrom by 20 pixels in an extremely dark environment. Thus, the position adjustment in FIG. 10 is performed in the same manner as in the horizontal direction position adjustment in the "first projection image position adjustment" except that the position adjustment in this example is carried out in the extremely dark environment. The data shown in FIG. 10 corresponds to the data shown in FIG. 9.

In FIG. 9, the position "10" is determined as the optimum projection position in the illumination condition of predetermined brightness. In FIG. 10, the position "9" is determined as the optimum projection position in the extremely dark environment. Comparison between FIGS. 9 and 10 shows that the optimum projection position in the extremely dark environment is shifted by one pixel from the optimum position under the illumination condition of the predetermined brightness (referred to as original optimum projection position).

Figure 11:
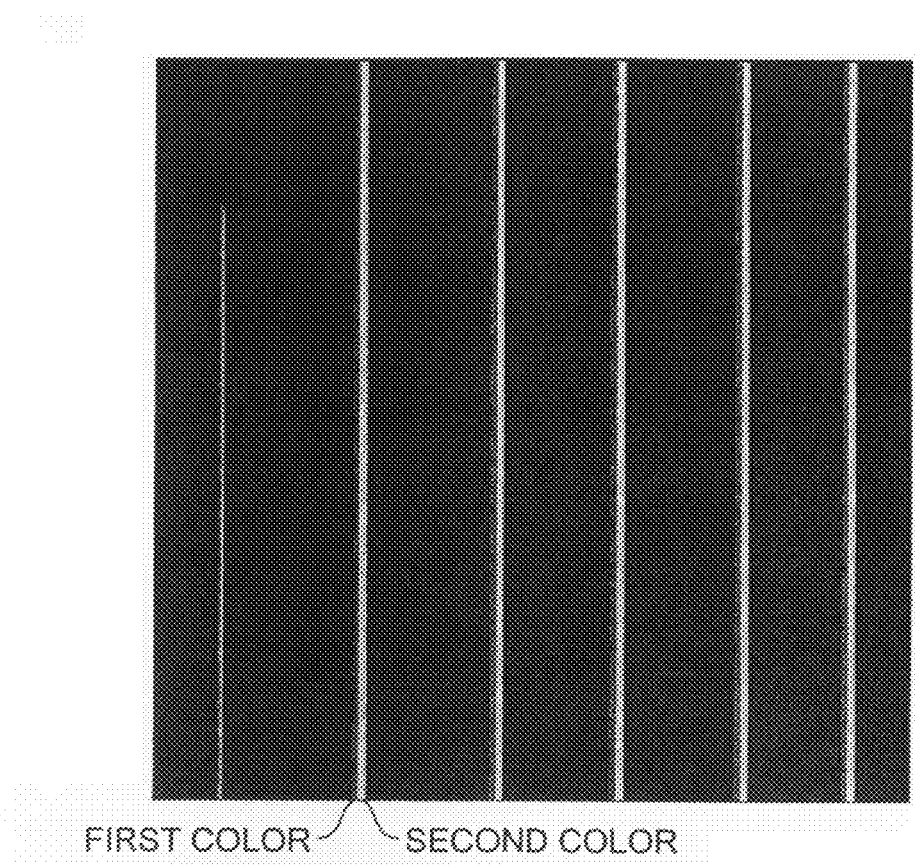
FIG. 11 shows the reason why the position shifted by one pixel is determined as the optimum projection position in the extremely dark environment.

This is, as shown in FIG. 11, because the number of pixels determined as white in the image data becomes the maximum at the position shifted by one pixel from the appropriate conditions of the adjustment images CG3 and CG4. More specifically, the experiment has clarified that the number of pixels determined as white in the image data becomes the maximum when the first color (R=255, G=160, B=0) of the respective lines constituting the pattern (first pattern) of the adjustment image CG3 and the second color (R=0, G=160, B=255) of the respective lines constituting the pattern (second pattern) of the adjustment image CG4 are located adjacent to each other.

A similar phenomenon occurs in the case of position adjustment in the vertical direction performed using the adjustment images CG1 and CG2. In the above case, the position "8" is determined as the optimum projection position. However, when the same process is performed in the extremely dark environment, the position "7" shifted by one pixel is determined as the optimum projection position in some cases.

The experiment shows that these phenomena are associated with the color array structure of color filters used in the image taking device 11. More specifically, though not described in the "first projection image position adjustment", color filters are generally contained within the image taking device when the image taking device 11 is of single-plate type. The color filters typically have the color array structure of Bayer arrays. It is considered that the position shifted by one pixel from the original optimum projection position is determined as the optimum projection position in the extremely dark environment due to the color array structure of Bayer arrays.

Figure 12:
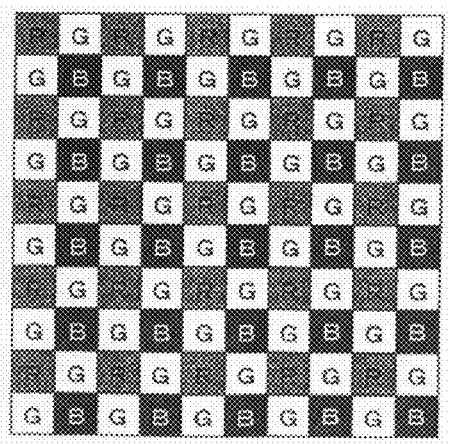
FIG. 12 schematically illustrates color filters having a color array structure of Bayer arrays.

FIG. 12 schematically shows the color filters having the color array structure of Bayer arrays. In FIG. 12, R corresponds to the red filter for transmitting red color, G corresponds to the green filter for transmitting green color, and B corresponds to the blue filter for transmitting blue color. These filters having the respective color components are arranged in matrix. In FIG. 12, the red filters are shown in gray, the green filters in white, and the blue filters in black.

As obvious from FIG. 12, the green filters form a checkered pattern in the respective rows and lines. However, the red filters and blue filters are alternately disposed in the directions of lines and rows, i.e., in every other line and row. Thus, the red filters and blue filters exist in some lines and rows, but not exist in lines and rows next to these lines and rows according to the color array structure.

This color array structure of Bayer arrays in the color filters of the image taking device deteriorates repeatability of the red and blue components. Since this effect appears as the inhibiting factor having been described above in the extremely dark environment, the position shifted by one pixel from the original optimum projection position is determined as the optimum projection position in the case of the position adjustment based on the image data obtained in the extremely dark environment.

In the extremely dark environment, therefore, the position shifted by one pixel from the optimum projection position under the condition of the predetermined brightness is determined as the optimum projection position. The "second projection image position adjustment" is the method for coping with this problem and is described hereinafter.

The "second projection image position adjustment" is a technique for providing appropriate position adjustment in an extremely dark environment. The structure of the multi-display projection display used in the "second projection image position adjustment" is similar to that shown in FIGS. 1 and 2.

FIGS. 13A and 13B schematically illustrate adjustment images used in the "second projection image position adjustment". In this example, adjustment images CG13 and CG14 used for position adjustment in the horizontal direction for respective images projected from the two projectors PJ1 and PJ2 disposed side by side in the horizontal direction.

The adjustment images CG13 and CG14 shown in FIGS. 13A and 13B have patterns (first pattern and second pattern, respectively) formed by a plurality of straight lines in the vertical direction by line drawing, similarly to the adjustment images CG3 and CG4 used in the position adjustment performed in the horizontal direction in the "first projection image position adjustment". The width (thickness) of the respective lines corresponds to one pixel of the liquid crystal modulators in the projectors PJ1 and PJ2, and the clearance between the respective lines corresponds to 20 pixels of the liquid crystal modulators in the projectors PJ1 and PJ2.

The adjustment images CG13 and CG14 are different from the adjustment images CG3 and CG4 in that the first color and second color of the adjustment images CG13 and CG14 are alternately allocated to the respective lines of the first pattern and second pattern in a predetermined cycle such that the first color of the pattern of the adjustment image CG13 (first pattern) overlaps with the second color of the pattern of the adjustment image CG14 (second pattern) and such that the second color of the pattern of the adjustment image CG13 (first pattern) overlap with the first color of the pattern of the adjustment image CG14 (second pattern) when the two adjustment images CG3 and CG4 are projected at appropriately correlated positions.

In this example, the color components R (red), G (green) and B (blue) of the first color have the pixel values of R=255, G=160 and B=0, respectively, and the color components R (red), G (green) and B (blue) of the second color have the pixel values of R=0, G=160 and B=255, respectively. Similarly to the above example, the G (green) component is set at 160 considering that the brightness characteristic in the image data varies due to the effect of the gamma characteristics of the projectors PJ1 and PJ2 and the image taking device 11 or the like. In this way, the value of G (green) component can be established at an appropriate value according to the conditions in each case. The background color is preferably black.

As illustrated in FIGS. 13A and 13B, the first color (to which a reference number Cr1 is given) and the second color (to which a reference number Cr2 is given) are alternately allocated to the adjustment image CG13 in the order of Cr1, Cr2, Cr1, and Cr2. On the other hand, the first color Cr1 and the second color Cr2 are alternately allocated to the adjustment image CG14 in the order of Cr2, Cr1, Cr2 and Cr1.

These adjustment images CG13 and CG14 can be produced using the adjustment image data producing unit 121 shown in FIG. 2. The adjustment images CG13 and CG14 thus produced are given to the projectors PJ1 and PJ2 using the adjustment image data outputting unit 122.

FIGS. 14A and 14B illustrate examples of the adjustment image CG13 and CG14, respectively, separately projected from the projectors PJ1 and PJ2 onto the screen SCR.

FIG. 15 illustrates the adjustment images CG13 and CG14 shown in FIGS. 14A and 14B and projected on the screen SCR with an overlapping area in a part of the adjustment images CG13 and CG14. As illustrated in FIG. 15, the adjustment image CG13 from the projector PJ1 and the adjustment image CG14 from the projector PJ2 are projected on the screen SCR forming the overlapping area in a part of the adjustment images CG13 and CG14. FIG. 15 shows the conditions of the adjustment images CG13 and CG14 before position adjustment performed in the horizontal direction.

Since FIGS. 14A and 14B and FIG. 15 are monochrome figures, it is difficult to recognize the color array structure of each pattern in adjustment images CG13 and CG14 from FIGS. 14A and 14B and FIG. 15. However, it is actually easy to recognize this color array structure on the color images which are the original images of FIGS. 14A and 14B and FIG. 15.

Figures 16A, 16B:
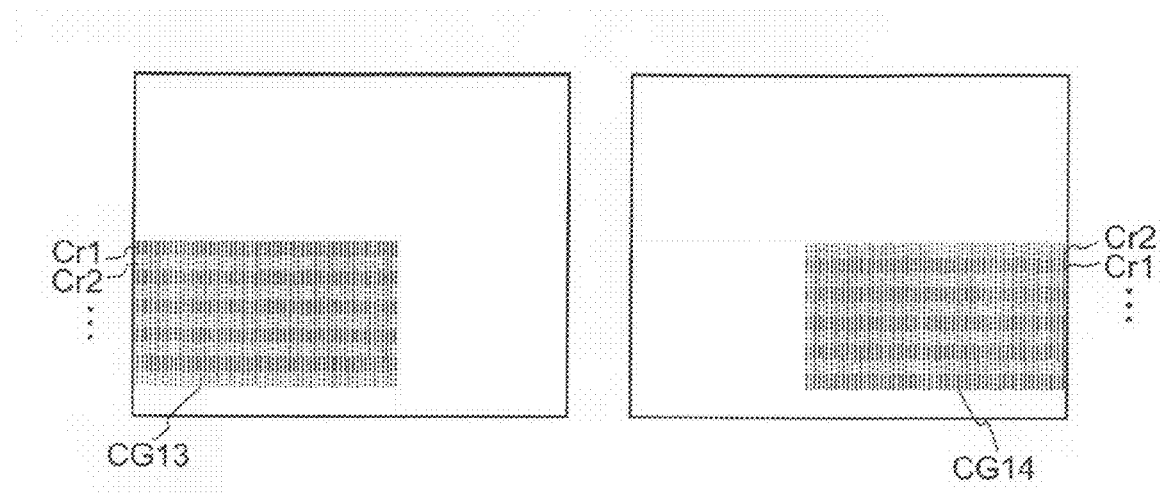
FIGS. 16A and 16B schematically illustrate the adjustment images CG13 and CG14 as the projection images on the screen SCR shown in FIGS. 14A and 14B.
Figure 17:
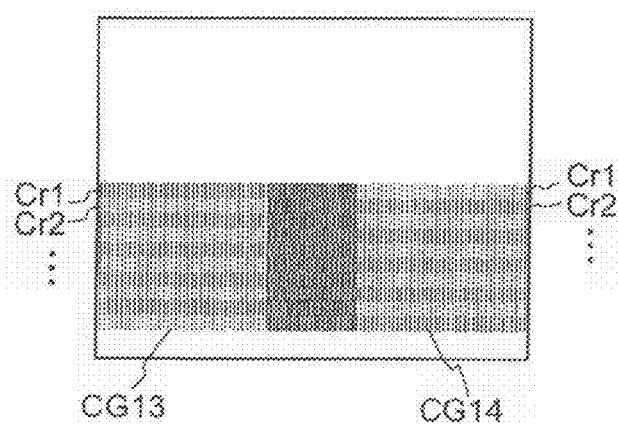
FIG. 17 schematically illustrates the adjustment images CG13 and CG14 as the projection images on the screen SCR shown in FIG. 15.

FIGS. 16A and 16B and FIG. 17 schematically illustrate the adjustment images CG13 and CG14 which are the projection images on the screen SCR shown in FIGS. 14A and 14B and FIG. 15. In FIGS. 16A and 168 and FIG. 17, the respective lengths of the first color Cr1 and second color Cr2 correspond to the length of 72 pixels in this example. In other words, the first color Cr1 and second color Cr2 are alternately located in the cycle of 72 pixels. The adjustment images CG13 and CG14 are now described with reference to FIGS. 16A and 16B and FIG. 17.

As illustrated in FIG. 17, after the adjustment images CG13 and CG14 are projected on the screen SCR, the position of either the adjustment image CG13 or CG14 is shifted by pixel in the horizontal direction. In this example, the adjustment image CG13 is fixed and the position of the adjustment image CG14 is shifted per pixel.

Similarly to the case of the "first projection image position adjustment", the position of the adjustment image CG14 from the projector PJ2 shifted by 10 pixels in the horizontal direction (left direction) from the initial position set by position adjustment through manual operation is determined as the process starting position in the "second projection image position adjustment".

Next, the adjustment image CG14 is sequentially shifted by pixel in the right direction from the process starting position to move the adjustment image CG14 by 20 pixels in total. The shift of the adjustment image CG14 by pixel can be easily achieved using a function of the projector PJ2 for shifting the position of the effective image display region of the image forming area by pixel.

Figure 18:
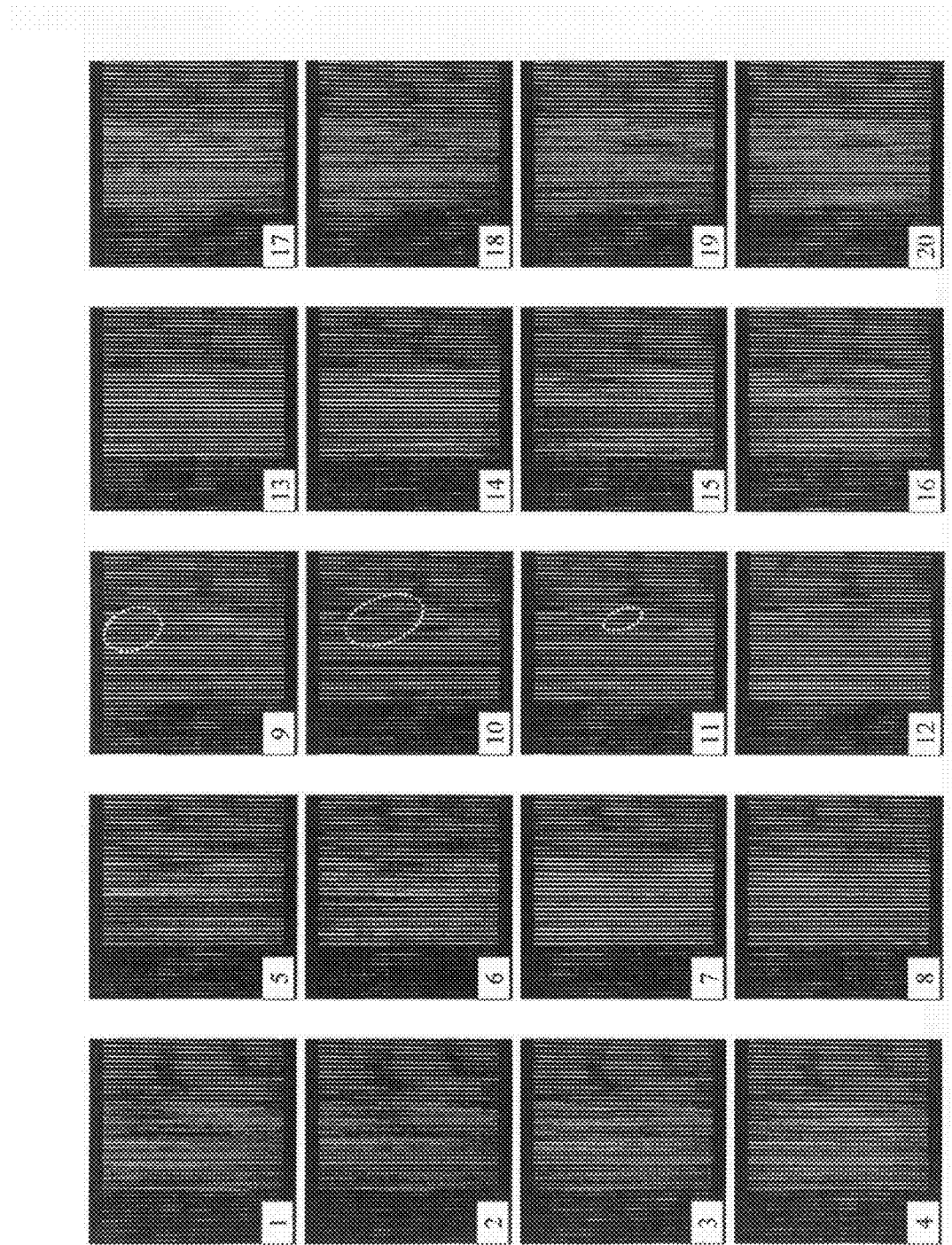
FIG. 18 shows an enlarged overlapping area of the adjustment images CG13 and CG14 in image data from the image taking device 11 at each position of the adjustment image CG14.

FIG. 18 shows enlarged overlapping areas of the adjustment images CG13 and CG14 shown in the image data obtained by the image taking device 11 at the respective positions of the adjustment image CG14. Each of the images in FIG. 18 shows the conditions of the adjustment images CG13 and CG14 at the corresponding position when the adjustment image CG14 is sequentially shifted by pixel in the right direction from the process starting position to move the image CG14 by 20 pixels in total. In FIG. 18, the numbers of 1 through 20 shown at the lower left corner of each image correspond to the respective positions when the adjustment image CG14 is shifted by 20 pixels from the process starting position, and the position "1" indicates the process starting position.

The image taking device 11 takes the adjustment images CG13 and CG14 on the screen SCR with the adjustment image CG14 shifted by pixel, and outputs the image data thus obtained. The image data is inputted to the image data inputting unit 131, and stored in the image data storing unit 132. Then, the evaluation value calculating unit 133 calculates evaluation value for each position of the adjustment image CG14 shifted by pixel based on the image data stored in the image data storing unit 132. The evaluation values are calculated by the same method as in the "first projection image position adjustment", and the explanation is not repeated herein.

As illustrated in FIG. 18, when the adjustment image CG14 is shifted by pixel so that the positions of the adjustment images CG13 and CG14 have an appropriate correlation, the white color appears in the overlapping area. In FIG. 18, the areas surrounded by white elliptical broken frames have the white color.

Since FIG. 18 is a monochrome figure, it is difficult to recognize appearance of the white color from FIG. 18. However, it is actually easy to recognize this appearance from the color images which are the original images of FIG. 18. It is easier to recognize appearance of the white color on the color images when white having the pixel values which have reached the predetermined threshold value in the overlapping area of the adjustment images CG13 and CG14 is indicated in pink.

Though not easily recognizable from FIG. 18, the white region becomes the maximum in the image at the position "10". Then, the white region rapidly decreases from the position "10" to the later positions as apparent from FIG. 19.

Figure 19:
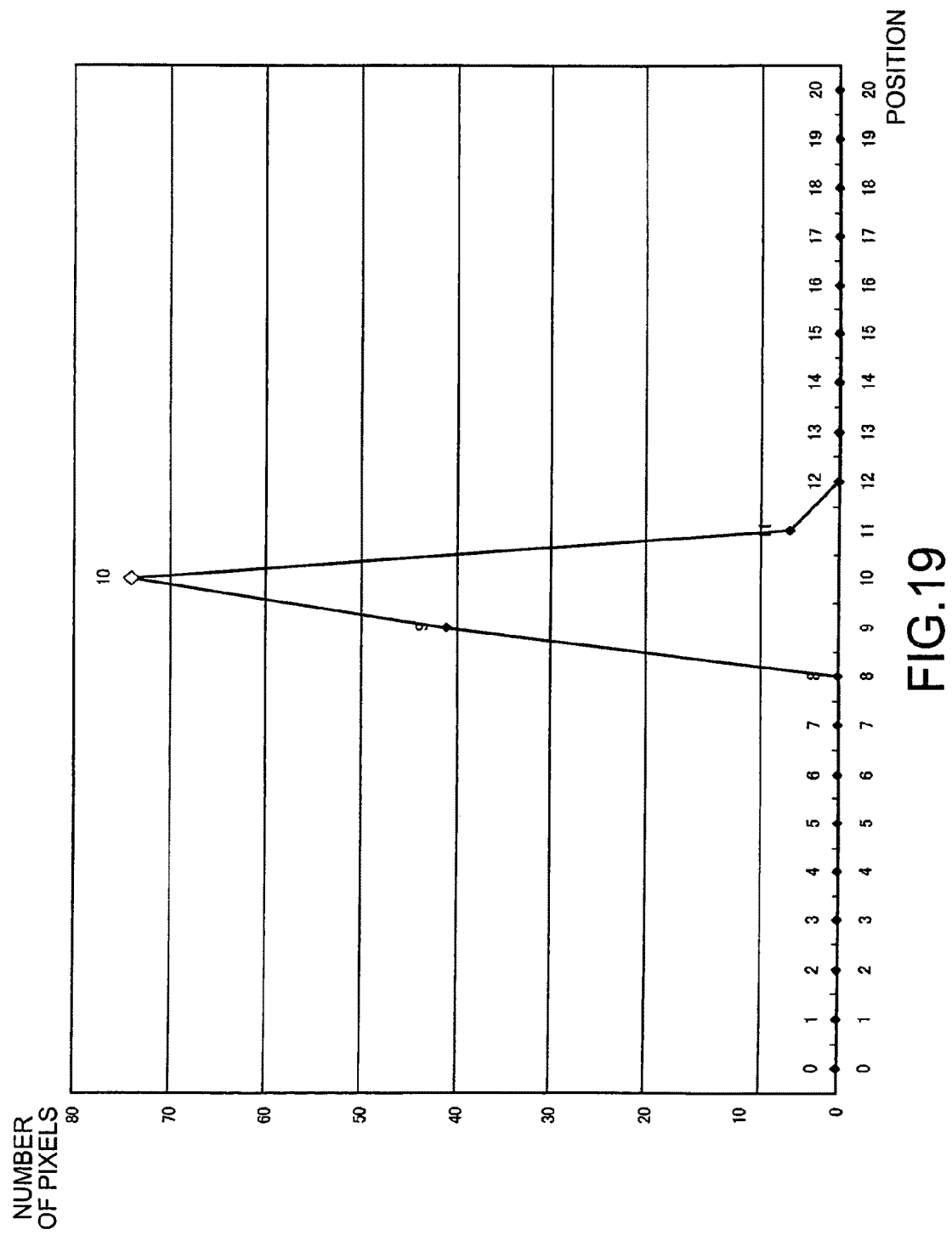
FIG. 19 shows the number of pixels determined as white at each position from the process starting position "1" to the position "20" shifted by 20 pixels from the process starting position "1" in the extremely dark environment.

FIG. 19 shows the number of pixels determined as white at each position from the process starting position "1" to the position "20" shifted therefrom by 20 pixels in the extremely dark environment. As obvious from FIG. 19, the number of pixels determined as white becomes the maximum at the position "10". Since the number of pixels determined as white becomes the maximum at the position "10", the same result as in the "first projection image position adjustment" shown in FIG. 9 is obtained.

More specifically, FIG. 19 shows that the first pattern of the adjustment image CG13 overlaps with the second pattern of the adjustment image CG14 at the optimum correlated positions in the horizontal direction when the adjustment image CG14 is located at the position "10". This means that projection can be conducted at the original optimum projection position established in the "first projection image position adjustment". Thus, when images are projected from the projectors PJ1 and PJ2 maintaining this positional relationship, the respective projection images can be projected at the optimum correlated positions (correlated positions in the horizontal direction).

The "second projection image position adjustment" is the position adjustment performed in the extremely dark environment. Therefore, as discussed above, the position shifted by one pixel from the original optimum projection position (see FIG. 9) is determined as the optimum projection position (see FIG. 10) when the adjustment images CG3 and CG4 used in the "first projection image position adjustment" are used for the position adjustment in the extremely dark environment. However, this drawback can be solved by using the adjustment images CG13 and CG14 shown in FIGS. 13A and 13B to effect projection as in the manner shown in FIG. 17 and carry out position adjustment operation shown in FIG. 18.

Figure 20:
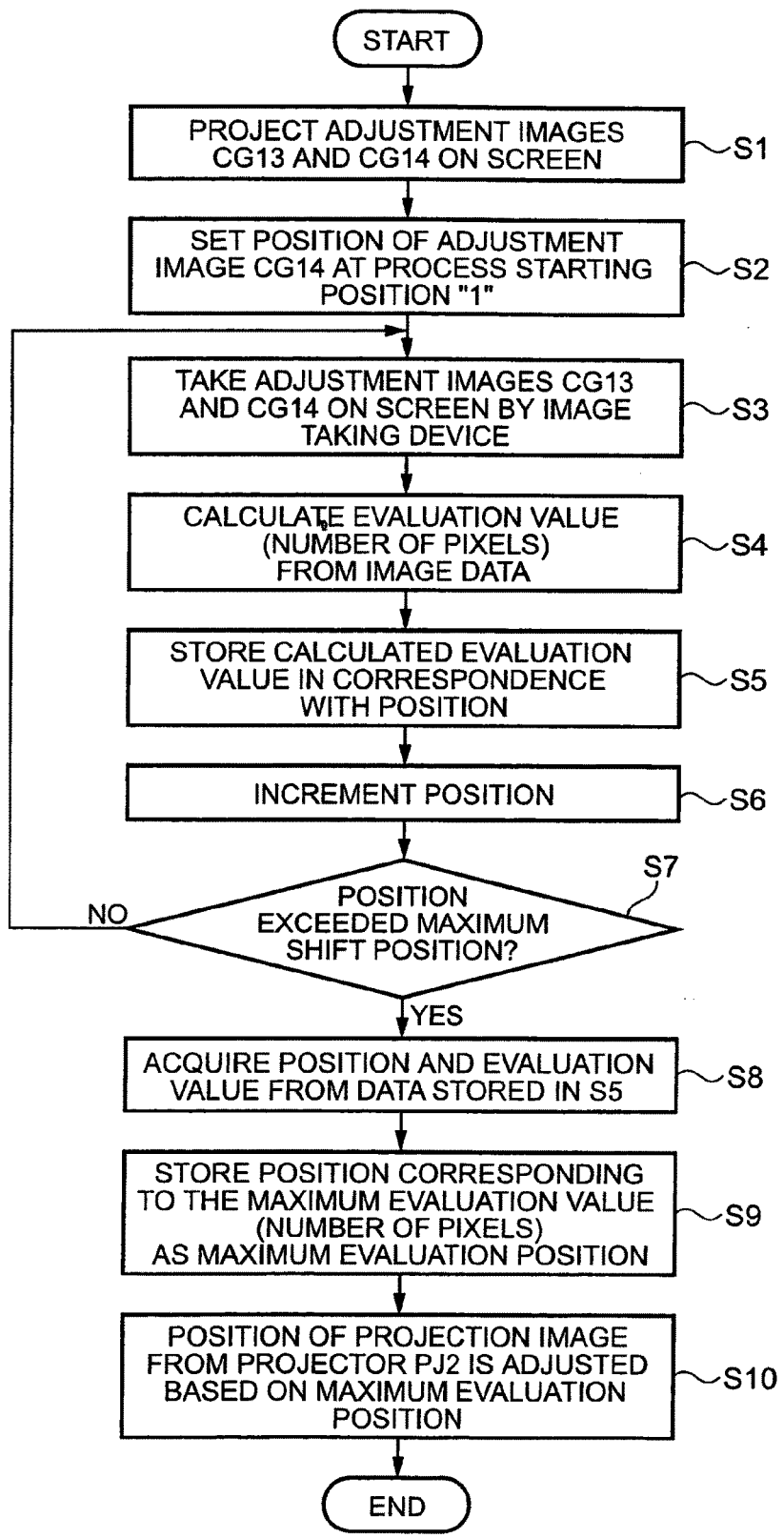
FIG. 20 is a flowchart showing the main procedures for performing position adjustment in the "second projection image position adjustment".

FIG. 20 is a flowchart showing main procedures for position adjustment in the "second projection image adjustment". Since the processes of the respective steps shown in FIG. 20 have been already explained, the overall process flow is briefly discussed herein.

Initially, the adjustment images CG13 and CG14 are projected from the projectors PJ1 and PJ2 onto the screen SCR (step S1). After the positions of the adjustment images CG13 and CG14 projected from the projectors PJ1 and PJ2 are manually adjusted by the user to a possible extent, the position of either the adjustment image CG13 or CG14 (adjustment image CG14 in this example) is set at the process starting position "1" (step S2). In this condition, the image taking device 11 takes the adjustment images CG13 and CG14 on the screen SCR (step S3).

Then, the evaluation values (numbers of pixels) are calculated from the image data obtained by taking the images (step S4), and the calculated evaluation values associated with the corresponding positions are stored (step S5).

Subsequently, the positions are incremented (step S6), and it is determined whether the incremented position has exceeded the maximum shift position ("20" in this example) (step S7). When it is determined that the position does not exceed the maximum shift position, the flow returns to step S3 and the processes after step S3 are performed. When it is determined that the position has exceeded the maximum shift position, the positions and evaluation values are obtained from the storage data stored in step S5 (step S8) and the position corresponding to the maximum evaluation value (number of pixels) acquired therefrom are stored in the maximum evaluation position storing unit 142 as the maximum evaluation position (step S9).

Then, the control unit 144 controls the position of the projector PJ2 such that the position of the projection image from the projector PJ2 corresponds to the maximum evaluation position. By this process, the respective projection images from the projectors PJ1 and PJ2 come to the optimum correlated positions in the horizontal direction.

In the above position adjustment method for the projection images, the adjustment image CG13 is fixed and the adjustment image CG14 is shifted to determine the position of the adjustment image CG14. However, it is obvious that the adjustment image CG13 may be shifted with the adjustment image CG14 fixed.

In the above example, the positions of the projection images projected from the two projectors PJ1 and PJ2 disposed side by side in the horizontal direction in the plural projectors included in the multi-projection display have been adjusted in the horizontal direction. However, the positions of the projection images from the two projectors PJ1 and PJ2 disposed side by side in the horizontal direction can be adjusted in the vertical direction by producing adjustment images CG11 and CG12 corresponding to the adjustment images CG1 and CG2 used in the "first projection image position adjustment".

FIGS. 21A and 21B schematically illustrate the adjustment images CG11 and CG12 used for the position adjustment in the vertical direction in the "second projection image position adjustment". The positions of the projection images from the projectors PJ1 and PJ2 disposed side by side in the horizontal direction can be adjusted in the vertical direction with high accuracy at high speed by the position adjustment operation similar to the vertical position adjustment in the "first projection image position adjustment" (see FIGS. 3A and 3B, 4, and 5) using the adjustment images CG11 and CG12. Moreover, since the adjustment images CG11 and CG12 have a color array structure considering the Bayer arrays for the respective patterns similarly to the adjustment images CG13 and CG14, highly accurate position adjustment can be achieved in the extremely dark environment.

In the above example, the position adjustment performed in the horizontal direction and vertical direction for the projection images from the projectors PJ1 and PJ2 disposed side by side in the horizontal direction in the "second projection image position adjustment" has been described. However, the position adjustment for the projection images from the two projectors PJ1 and PJ2 disposed side by side in the vertical direction can be performed in the horizontal direction and vertical direction in the same manner as in the above example by using the adjustment images CG11 and CG12 shown in FIGS. 21A and 21B and the adjustment images CG13 and CG14 shown in FIGS. 13A and 13B.

In this case, it is assumed that the projector PJ1 projects images on the upper region of the screen SCR in the vertical direction, and that the projector PJ2 projects images on the lower region of the screen SCR in the vertical direction.

The position adjustment performed in the horizontal direction and vertical direction for the projection images from the two projectors PJ1 and PJ2 disposed side by side in the vertical direction using the adjustment images CG11 and CG12 and the adjustment images CG13 and CG14 is now briefly explained.

An example of the position adjustment performed in the vertical direction for the projection images from the two projectors PJ1 and PJ2 disposed side by side in the vertical direction using the adjustment images CG11 and CG12 is first briefly described.

FIGS. 22A and 22B schematically illustrate the conditions of the adjustment images CG11 and CG12 shown in FIGS. 21A and 21B separately projected from the projectors PJ1 and PJ2 onto the screen SCR.

FIG. 23 schematically illustrates the conditions of the adjustment images CG11 and CG12 shown in FIGS. 22A and 22B projected on the screen SCR with an overlapping area in a part of the adjustment images CG11 and CG12. FIG. 23 shows the conditions of the adjustment images CG11 and CG12 before position adjustment. Similarly to the above example, either the adjustment image CG11 or the adjustment image CG12 (projection image CG11 projected from the projector PJ1 in this example) is fixed, and the other adjustment image (projection image CG12 from the projector PJ12 in this example) is shifted in the vertical direction (up-and-down direction) with respect to the screen SCR in this example.

More specifically, the position of the adjustment image CG12 from the projector PJ2 shifted by 10 pixels in the vertical direction (upward direction in this example) from the conditions of the adjustment images CG11 and CG12 from the projectors PJ1 and PJ2 after position adjustment by the user's manual operation to a possible extent is determined as the process starting position. Then, the adjustment image CG12 is shifted by pixel from the process starting position in the downward direction to move the adjustment image CG12 by 20 pixels in total. The processes of the position adjustment after this step are similar to those explained in the above example.

In this case, the position adjustment for the projection images projected from the two projectors PJ1 and PJ2 disposed side by side in the vertical direction can be performed in the vertical direction with high accuracy at high speed. Moreover, since the adjustment images CG11 and CG12 have a color array structure considering the Bayer arrays for the respective patterns, highly accurate position adjustment can be achieved in the extremely dark environment.

The position adjustment for the projection images from the two projectors PJ1 and PJ2 disposed side by side in the vertical direction can be performed in the horizontal direction using the adjustment images CG13 and CG14 in the similar manner as in the position adjustment described above. However, the position adjustment performed in the horizontal direction for the projection images from the two projectors PJ1 and PJ2 disposed side by side in the vertical direction is not repeatedly explained herein.

Position adjustment for the images from the respective projectors in the multi-projection display containing m projectors in the horizontal direction and n projectors in the vertical direction, i.e., m×n projectors can be performed with high accuracy in a short processing time by combining the position adjustment operations using the adjustment images CG11 and CG12 and for the adjustment images CG13 and CG14.

Figure 24:
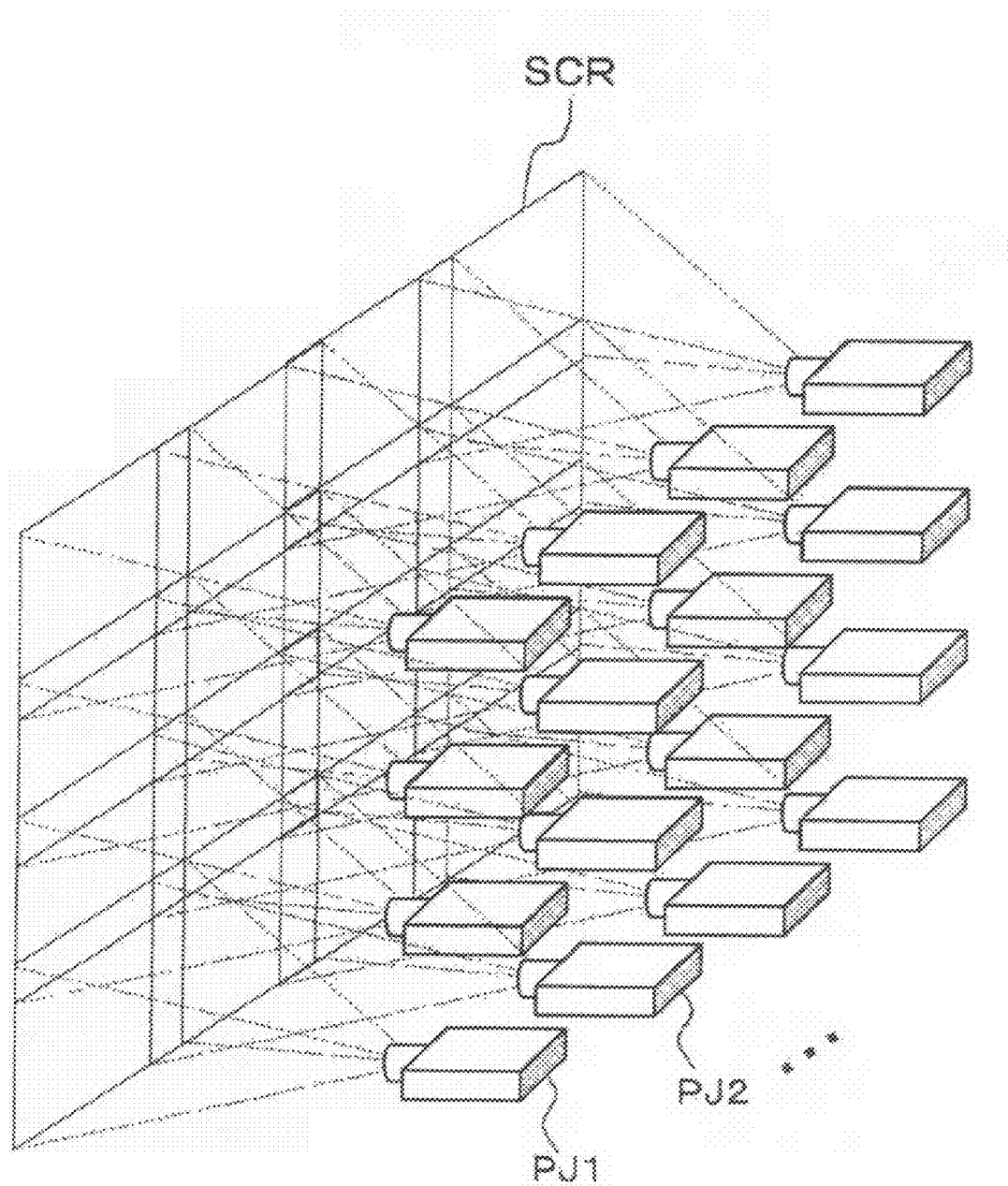
FIG. 24 illustrates a multi-projection display having 4×4 projectors, i.e., 16 projectors in total.

For example, FIG. 24 shows a multi-projection display having 4×4 projectors (m=4, n=4) PJ1, PJ2 and others, i.e., 16 projectors in total. In this multi-projection display, similar position adjustment for the projection images from all the projectors can be performed with high accuracy in a short processing time by determining pairs of the adjoining two projectors and executing the position adjustment operation explained in the "second projection image position adjustment". Moreover, since the adjustment images CG11 and CG12 and the adjustment images CG13 and CG14 have a color array structure considering the Bayer arrays for the respective patterns, highly accurate position adjustment can be achieved in the extremely dark environment.

The invention is not limited to the embodiment described herein, but various modifications and changes can be given to the invention without departing from the scope and spirit of the invention. For example, while the projection images from the projectors PJ1 and PJ2 are projected on the screen SCR by tiling projection in this embodiment, the invention is applicable to the stacking projection where the projection images from the projectors PJ1 and PJ2 are stacked in the same projection area.

In this embodiment, the white color appears in the overlapping area when the two adjustment images are projected at the appropriately correlated positions. However, the color which appears when the two adjustment images overlap with each other is not limited to white as long as a predetermined characteristic is exhibited in the overlapping area of the two adjustment images projected at the appropriately correlated positions.

In this embodiment, the threshold for the pixel values is set at "240, 240, 240" providing a margin for the variances due to the device characteristics such as the gamma characteristic and the illumination condition. However, the threshold may be established at appropriate values according to the environmental conditions such as the device characteristics and the illumination.

While the clearance between each line in the adjustment images CG11 and CG12 and the adjustment images CG13 and CG14 is set at the length of 20 pixels in this embodiment, this clearance is not limited to the length of 20 pixels. However, a length equal to or larger than 10 pixels is preferable.

In this embodiment, the patters constituted by the straight lines in the horizontal and vertical directions are used for the adjustment images CG11 and CG12 and the adjustment images CG13 and CG14. However, various other patterns may be used for the adjustment images CG11 and CG12 and the adjustment images CG13 and CG14 as long as the patterns have drawings of lines.

While the color cycle of the first color Cr1 and second color Cr2 in one line has the length of 72 pixels, the color cycle is not limited to this length.

It is preferable that the evaluation value calculating unit 133 calculates evaluation values after taking images several times under the same conditions of the correlated positions of the two adjustment images. By calculating evaluation values using image data obtained by image taking several times, highly accurate evaluation values with reduced noise of the image taking device can be acquired. In this case, the average of the evaluation values calculated using the image data obtained by image taking several times may be acquired and determined as the required evaluation value.

In this embodiment, the position adjustment for the projection images from the two projectors of the plural projectors has been discussed. This is because the position adjustment performed according to the invention uses at least two projectors as a pair, and includes simultaneous position adjustment for projection images projected from a plurality of projectors or plural pairs of projectors.

In a multi-projection display using 2×2 projectors, i.e., 4 projectors, for example, it is possible that position adjustment for projection images from two projectors disposed in the upper position as a pair is performed in the horizontal direction, and that position adjustment for projection images from two projectors disposed in the lower position as a pair is simultaneously performed in the horizontal direction. Thus, the positions of the projection images from a plurality of projectors or plural pairs of projectors can be efficiently controlled by simultaneous position adjustment for these images even in the case of the multi-projection display including a number of projectors shown in FIG. 24, which considerably reduces time required for the position adjustment.

While the projectors used in this embodiment are three-plate-type projectors providing three primary colors of R, G and B, the invention is applicable to multicolor-type projectors providing four or more primary colors.

In this embodiment, the projectors are physically disposed side by side in the horizontal direction or vertical direction so that projection images from the plural projectors can be located (projected) in the horizontal direction or vertical direction. However, it is obvious that a projection position changing function such as a lens shift may be used instead of physically changing the positions of the projectors.

It is possible to prepare a position adjustment program for projection images containing procedures for performing the position adjustment according to the invention, and store this position adjustment program for projection images in various types of storage medium. Thus, the scope of the invention includes the storage medium which stores the position adjustment program for projection images. The position adjustment program for projection images may be obtained through networks.

The entire disclosure of Japanese Patent Application No. 2005-222525, filed Aug. 1, 2005 is expressly incorporated by reference herein.

What is claimed is:

1. A position adjustment method for projection images for adjusting positions of two projection images projected from two of plural projectors contained in a multi-projection display onto a projection surface such that the two projection images have an overlapping area by using two adjustment images one of which has a first pattern and the other of which has a second pattern, comprising:

setting pixel values of a first color and pixel values of a second color such that a predetermined characteristic is exhibited in the overlapping area when the two adjustment images are projected at appropriately correlated positions, producing two adjustment image data, corresponding to the two adjustment images, in which the first color and the second color are allocated to the first pattern and the second pattern such that the first color of the first pattern overlaps with the second color of the second pattern and such that the second color of the first pattern overlaps with the first color of the second pattern when the two adjustment images are projected at appropriately correlated positions, and giving the adjustment image data to the two projectors;

calculating evaluation values associated with the predetermined characteristic based on image data obtained by taking an image of the projection surface on which the two adjustment images corresponding to the two adjustment image data are projected from the two projectors; and performing position adjustment for the two projection images based on the evaluation values, wherein at least one of the above steps is performed by a control unit.

2. A position adjustment method for projection images according to claim 1, the image taking device is a single-plate-type image taking device which contains color filters having a color array structure of Bayer arrays.

3. A position adjustment method for projection images according to claim 1, the first color and the second color are alternately allocated to each of the first pattern and the second pattern in a predetermined cycle.

4. A position adjustment method for projection images according to claim 1, the calculating including, shifting at least one of the two adjustment images by pixel in the horizontal direction or vertical direction, and calculating the evaluation values every time when the adjustment image is shifted by pixel.

5. A position adjustment method for projection images according to claim 1, the patterns contain drawings of lines each having a width corresponding to one pixel.

6. A position adjustment method for projection images according to claim 1, the predetermined characteristic corresponds to pixel values in the image data.

7. A position adjustment method for projection images according to claim 6, the evaluation values correspond to the numbers of pixels having the pixel values equal to or larger than a threshold value; and the performing including adjusting the positions of the two projection images while setting the optimum projection position for the two projection images at the position at which the number of pixels having the pixel values equal to or larger than the threshold value becomes the maximum.

8. A position adjustment method for projection images according to claim 7, further including setting the threshold value to a value corresponding to a color which is first exhibited when the patterns of the two adjustment images overlap with each other.

9. A position adjustment method for projection images according to claim 8, the first color has relatively strong red component and relatively weak green component;

the second color has relatively strong blue component and relatively weak green component; and the color first exhibited when the patterns of the two adjustment images overlap with each other is white.

10. A position adjustment method for projection images according to claim 1, the calculating including calculating the evaluation values after taking the two adjustment images several times with the two adjustment images located at the same correlated positions.

11. A position adjustment method for projection images according to claim 1, the calculating and performing including executing the position adjustment for the two projection images by shifting the position of the effective image display region in the image forming area of an electro-optical modulator included in one of the two projectors by pixel.

12. A position adjustment apparatus for projection images for adjusting positions of two projection images projected from two of plural projectors contained in a multi-projection display onto a projection surface such that the two projection images have an overlapping area by using two adjustment images one of which has a first pattern and the other of which has a second pattern, comprising:

an adjustment image data output device for setting pixel values of a first color and pixel values of a second color such that a predetermined characteristic is exhibited in the overlapping area when the two adjustment images are projected at appropriately correlated positions, producing two adjustment image data, corresponding to the two adjustment images, in which the first color and the second color are allocated to the first pattern and the second pattern such that the first color of the first pattern overlaps with the second color of the second pattern and such that the second color of the first pattern overlaps with the first color of the second pattern when the two adjustment images are projected at appropriately correlated positions, and giving the adjustment image data to the two projectors;

an evaluation value calculation device for calculating evaluation values associated with the predetermined characteristic based on image data obtained by taking an image of the projection surface on which the two adjustment images corresponding to the two adjustment image data are projected from the two projectors; and a position adjustment control device for performing position adjustment for the two projection images based on the evaluation values.

13. A computer-readable storage medium that stores a position adjustment program for projection images for adjusting positions of two projection images projected from two of plural projectors contained in a multi-projection display onto a projection surface such that the two projection images have an overlapping area by using two adjustment images one of which has a first pattern and the other of which has a second pattern, the position adjustment program comprising:

instructions for setting pixel values of a first color and pixel values of a second color such that a predetermined characteristic is exhibited in the overlapping area when the two adjustment images are projected at appropriately correlated positions, producing two adjustment image data, corresponding to the two adjustment images, in which the first color and the second color are allocated to the first pattern and the second pattern such that the first color of the first pattern overlaps with the second color of the second pattern and such that the second color of the first pattern overlaps with the first color of the second pattern when the two adjustment images are projected at appropriately correlated positions, and giving the adjustment image data to the two projectors;

instructions for calculating evaluation values associated with the predetermined characteristic based on image data obtained by taking an image of the projection surface on which the two adjustment images corresponding to the two adjustment image data are projected from the two projectors; and instructions for performing position adjustment for the two projection images based on the evaluation values.

14. A multi-projection display, comprising:

a first projector capable of projecting a first projection image onto a projection surface;

a second projector capable of projecting a second projection image onto the projection surface such that the first and second projection images have overlapping area;

an adjustment image data output device for setting pixel values of a first color and pixel values of a second color such that a predetermined characteristic is exhibited in the overlapping area when an adjustment image having a first pattern and an adjustment image having a second pattern both from two of the plural projectors are projected at appropriately correlated positions, producing two adjustment image data, corresponding to the two adjustment images, in which the first color and the second color are allocated to the first pattern and the second pattern such that the first color of the first pattern overlaps with the second color of the second pattern and such that the second color of the first pattern overlaps with the first color of the second pattern when the two adjustment images are projected at appropriately correlated positions, and giving the adjustment image data to the two projectors;

an evaluation value calculation device for calculating evaluation values associated with the predetermined characteristic based on image data obtained by taking an image of the projection surface on which the two adjustment images corresponding to the two adjustment image data are projected from the two projectors; and a position adjustment control device for performing position adjustment for the first and second projection images based on the evaluation values.

15. A multi-projection display according to claim 14, capable of projecting images onto a projection surface by tiling projection such that a plurality of projection images from the plural projectors can have overlapping areas.

16. A multi-projection display according to claim 14, capable of projecting images onto a projection surface by stacking projection such that a plurality of projection images from the plural projectors can have overlapping areas.

* * * * *